(12) United States Patent
Tsuji

(10) Patent No.: US 6,459,503 B1
(45) Date of Patent: Oct. 1, 2002

(54) IMAGE FORMING APPARATUS

(75) Inventor: Hiroyuki Tsuji, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 08/352,879

(22) Filed: Dec. 9, 1994

(30) Foreign Application Priority Data

Dec. 13, 1993 (JP) ............................................. 5-311522

(51) Int. Cl.$^7$ ................................................. H04N 1/40
(52) U.S. Cl. ........................ 358/3.06; 358/448; 358/534
(58) Field of Search ................................. 358/455, 456, 358/462, 443, 448, 449, 530, 534

(56) References Cited

U.S. PATENT DOCUMENTS 4,553,172 A * 11/1985 Yamada et al. .............. 358/456
4,949,188 A * 8/1990 Sato ............................ 358/448
5,481,365 A * 1/1996 Arimoto ..................... 358/449

FOREIGN PATENT DOCUMENTS

JP 4-270556 9/1992

* cited by examiner

Primary Examiner—Thomas D. Lee
(74) Attorney, Agent, or Firm—Fitzpatrick, Cella, Harper & Scinto

(57) ABSTRACT

Disclosed is an image forming apparatus including an input circuit for selectively inputting a binary image signal and a multivalued image signal from an external device, a holding circuit for holding the serially input image signal for a predetermined period, outputting the image signal in units of a plurality of pixels, holding the image signal for a period corresponding to the number of the unit pixels and an information amount per pixel, and changing the number of the unit pixels in accordance with whether the input image signal is a multivalued signal or a binary signal for one pixel, a memory for storing the image signal from the holding circuit in units of the plurality of pixels, a readout circuit for reading out the image signal from the memory in units of the plurality of pixels, and an image forming circuit for forming an image on the basis of the image signal read out by the readout circuit. This apparatus can increase the image formation speed by performing optimum processing for the input signal.

12 Claims, 20 Drawing Sheets

|  | a | b | c |
|---|---|---|---|
| TOPAD | 0 | 0 | X-1 |
| X_SET | 1 | 1 | X |
| X_SIGN | 0 | 0 | 0 |
| Y_SET | X | X | 1 |
| Y_SIGN | 0 | 0 | 1 |
| ROT0 | 0 | 0 | 0 |
| ROT1 | 0 | 0 | 1 |
| R/WMD | 1 | 0 | 0 |
| LWD | X | X | Y |
| PWD | Y | Y | X |

X = LWD / 4
Y = PWD

FIG. 14

|        | a       | b         |
|--------|---------|-----------|
| TOPAD  | X*Y-1   | X*(Y-1)   |
| X_SET  | 1       | X         |
| X_SIGN | 1       | 1         |
| Y_SET  | X       | 1         |
| Y_SIGN | 1       | 0         |
| ROT0   | 1       | 1         |
| ROT1   | 0       | 1         |
| R/WMD  | 0       | 0         |
| LWD    | X       | Y         |
| PWD    | Y       | X         |

X = LWD / 4
Y = PWD

IMAGE FORMING APPARATUS

BACKGROUND OF THE INVENTION

1. Field of the Invention

The present invention relates to an image forming apparatus and, more particularly, to an image forming apparatus such as a digital copying machine which includes a memory means, e.g., a page memory.

2. Description of the Related Art

As an apparatus of this type, an image forming apparatus such as a color digital copying machine is widely known. In such an image forming apparatus, an optical system is moved to illuminate an original, and the reflected light from the original is read by a photoelectric conversion device such as a CCD and output after being subjected to various image processing operations.

Generally, an image forming apparatus of this type includes an image transfer member such as a transfer drum, and color-separated images of magenta, cyan, yellow, and black are sequentially overlapped on this transfer member to form a color image.

As recording paper cassettes for storing sheets of recording paper for printing out color images formed, A3-, A4-, B4-, and B5-size cassettes for example, are prepared in correspondence with the sizes of recording paper. In copying an A3-size original by reducing it to an A4 copy size, an A4R-size recording paper cassette which is the lateral form of A4-size recording paper is also required. Likewise, a B5R-size recording paper cassette is necessary when a B4-size original is to be copied by reducing to a B5 copy size.

It is also a common approach to temporarily store read image signals into a page memory and form images while reading out the images stored in the memory.

Unfortunately, the above conventional apparatuses have the following problems.

That is, the access time of, e.g., a DRAM used as the page memory has its limit, and this restricts the rate of read and write of image signals. Therefore, the image formation speed cannot be raised in forming images by reading out image signals from the memory. In addition, if the number of recording paper cassettes is increased to meet various sizes of recording paper for use in printing out images, a paper feed mechanism is complicated and increased in size. This unavoidably increases the size of an apparatus.

Furthermore, image signals to be stored in the memory include those in which one pixel is converted into a multi-valued signal and those in which one pixel is converted into a binary signal. The conventional apparatuses discussed above are not so designed as to reduce the image forming time when the memory is used or store both the multivalued and binary signals in the memory with a high efficiency.

SUMMARY OF THE INVENTION

It is an object of the present invention to solve the above conventional problems.

It is another object of the present invention to provide an image forming apparatus capable of processing both binary and multivalued image signals at a high efficiency.

To achieve the above object, according to one aspect of the present invention, there is provided an image forming apparatus, comprising input means for selectively inputting a binary image signal and a multivalued image signal for one pixel from an external device, holding means for holding the input image signal for a predetermined period and outputting the image signal in units of a plurality of pixels, the holding means holding the image signal for a period corresponding to the number of the unit pixels and an information amount per pixel, and changing the number of the unit pixels in accordance with whether the input image signal is a multi-valued signal or a binary signal for one pixel, storage means for storing the image signal from the holding means in units of the plurality of pixels, readout means for reading out the image signal from the storage means in units of the plurality of pixels, and image forming means for forming an image on the basis of the image signal read out by the readout means.

It is still another object of the present invention to provide an image forming apparatus capable of increasing the image formation speed in forming images corresponding to binary and multivalued image signals, by performing optimum processing for each image.

To achieve the above object, according to another aspect of the present invention, there is provided an image forming apparatus, comprising input means for selectively inputting a binary image signal and a multivalued image signal for one pixel from an external device, storage means for storing the image signal, memory control means for controlling write/read access of the image signal to the storage means, the memory control means performing the write/read access of the image signal to the storage means in units of a plurality of pixels, and changing the number of the unit pixels in accordance with whether the image signal to be processed is a binary image signal or a multivalued image signal, and image forming means for forming an image corresponding to the image signal from the storage means.

Other features and advantages of the present invention will become apparent from the following description taken in conjunction with the accompanying drawings, in which like reference characters designate the same or similar parts throughout the figures thereof.

BRIEF DESCRIPTION OF THE DRAWINGS

FIG. 9 is a block diagram showing the detailed arrangement of an image signal controller in FIG. 3;

FIG. 13 is a view showing signals set in the memory control unit in FIG. 2;

FIG. 14 is a view showing signals set in the memory control unit in FIG. 2;

DETAILED DESCRIPTION OF THE PREFERRED EMBODIMENTS

An image forming apparatus according to one embodiment of the present invention will be described in detail below with reference to the accompanying drawings.

Figure 1:
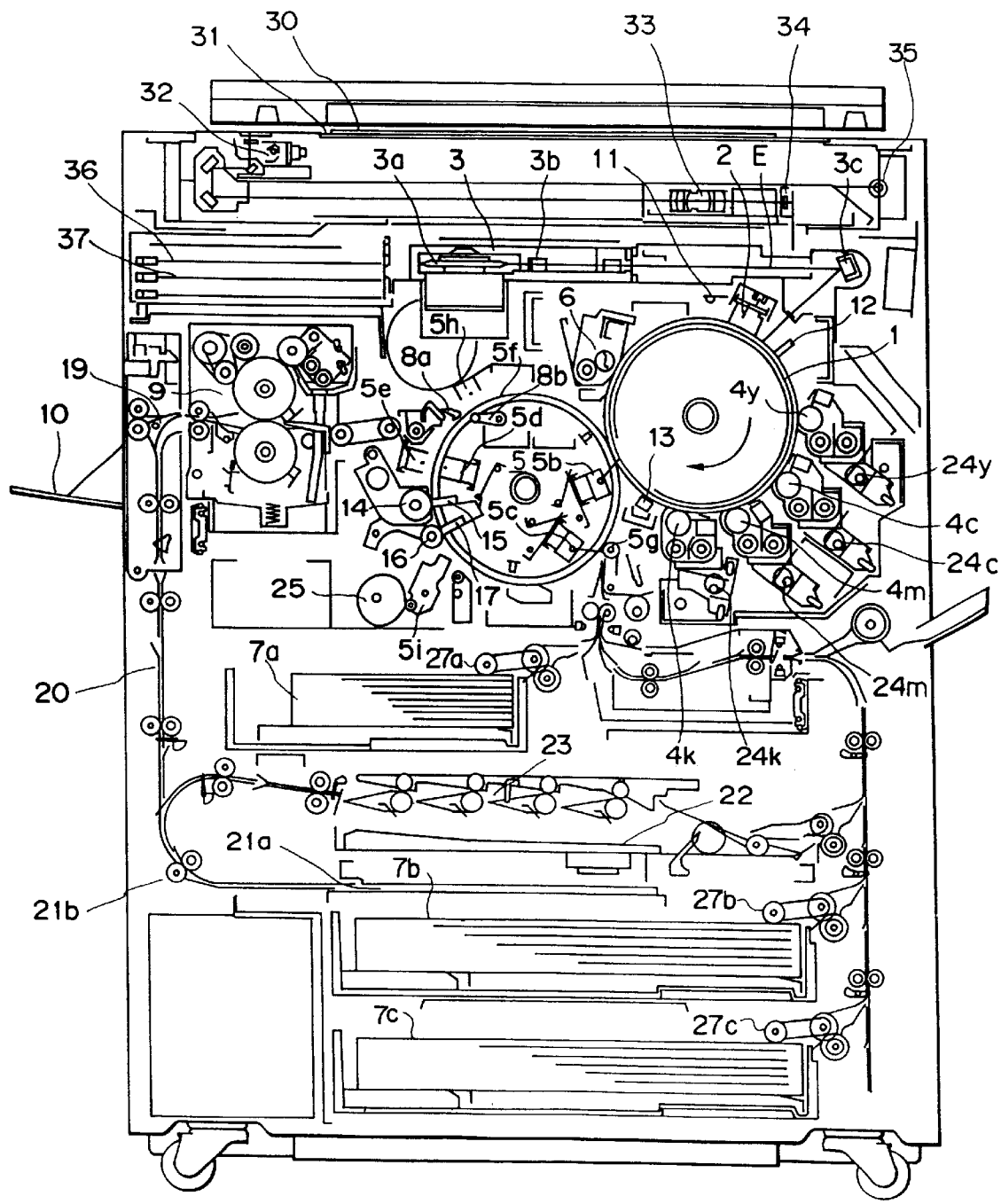
FIG. 1 is a schematic view showing a digital copying machine according to one embodiment of the present invention.

FIG. 1 is a schematic view showing a digital copying machine as one embodiment of the present invention. The upper portion of the machine is a reader section for reading color images and performing image processing for the read images. The lower portion of the machine is a printer section for printing out, e.g., the images read by the reader section.

In the reader section, an original 30 is placed on original table glass 31, and a well-known original scanning unit including an exposure lamp 32 is scanned at a fixed speed corresponding to a preset magnification by an optical system read driving motor 35. An image of the light reflected by the original 30 is focused on an image sensor 34 by a lens 33, obtaining image signals separated into colors. The image sensor 34 is constituted by three line CCDs arranged adjacent to each other and including filters of red R, green G, and blue B.

The output color-separated image signals from the image sensor 34 are subjected to image processing performed by an image processing unit 36 and a controller 37 and transferred to the printer section.

Note that an operation unit is provided near the original table glass 31. The operation unit includes, e.g., switches for setting various modes related to copy sequences and a display.

In the printer section, a photosensitive drum 1 as an image carrier is axially supported to be rotatable in the direction indicated by an arrow. Around the photosensitive drum 1, a pre-exposure lamp 11, a corona charger 2, a laser exposing optical system 3, a potential sensor 12, developing devices 4 of the respective colors, a light amount sensor 13, a transfer unit 5, and a cleaning device 6 are arranged.

The image signal from the reader section is converted into a laser beam signal by the laser exposing optical system 3. This laser beam E is reflected by a polygonal mirror 3a and radiated on the surface of the photosensitive drum 1 via a lens 3b and a mirror 3c. In image formation, the photosensitive drum 1 is rotated in the arrow direction, discharged by the pre-exposure lamp 11, and evenly charged by the charger 2. Thereafter, a latent image is formed for each of the color-separated images on the photosensitive drum 1.

Subsequently, a predetermined one of the developing devices 4 is operated to develop the corresponding latent image formed, thereby forming a toner image containing a resin as a base. The developing devices 4 selectively come close to the photosensitive drum 1 by the actions of eccentric cams 24y, 24m, 24c, and 24k in accordance with the separated colors.

The toner images thus formed are transferred to recording paper which is fed from a selected one of recording paper cassettes 7a, 7b, and 7c to the position at which the recording paper opposes the photosensitive drum 1, via a conveyor system and the transfer unit 5. Note that the choice of the recording paper cassettes 7 is done by driving one of pickup rollers 27a, 27b, and 27c in accordance with a control signal, which corresponds to the size of a recording image, from the controller 37.

In this embodiment, the transfer unit 5 includes a transfer drum 5a, a transfer charger 5b, an attraction charger 5c for electrostatically attracting recording paper, an attraction roller 5g which opposes the attraction charger 5c, an inner charger 5d, and an outer charger 5e. A cylindrical recording paper carrier sheet 5f made from a dielectric substance is integrally adhered to the circumferential opening region of the transfer drum 5a which is so axially supported as to be rotated. Note that a dielectric sheet such as a polycarbonate film is used as the recording paper carrier sheet 5f. As the transfer drum 5a is rotated, the toner images formed on the photosensitive drum 1 are transferred by the transfer charger 5b to recording paper carried by the recording paper carrier sheet 5f.

In this manner, a desired number of color images are transferred to the recording paper attracted and conveyed by the recording paper carrier sheet 5f, thereby forming a full-color image. When the transfer of toner images of four colors is completed, the recording paper is separated from the transfer drum 5a by the actions of a separation gripper 8a, a separation push roller 8b, and a separation charger 5h, and is delivered to a tray 10 via a fixing device 9.

After the transfer, the residual toner on the surface of the photosensitive drum 1 is removed by the cleaning device 6. Thereafter, the photosensitive drum 1 is again subjected to the image formation process.

In forming images on the both surfaces of recording paper, a guide 19 is driven to guide the recording paper that has been delivered from the fixing device 9 to a reversal path 21a through a vertical conveyance path 20. A reversing roller 21b is then rotated in the reverse direction to guide the recording paper in the direction opposite to the feed direction. Consequently, the recording paper is stored in an intermediate tray 22. Thereafter, the image formation process described above is again performed to form the image on the other surface of the recording paper.

To prevent adhesion of a powder such as toner to the recording paper carrier sheet 5f and to thereby prevent adhesion of an oil or the like to recording paper, cleaning is performed by using a fur blush 14 and a backup brush 15 which opposes the fur brush 14 via the recording paper carrier sheet 5f, or by using an oil removing roller 16 and a backup brush 17 which opposes the oil removing roller 16 via the recording paper carrier sheet 5f. This cleaning is performed before and after image formation and whenever jam (paper jam) occurs.

In this embodiment, the gap between the recording paper carrier sheet 5f and the photosensitive drum 1 can be set to an arbitrary value by operating a cam follower 5i integrated with the transfer drum 5a by operating the eccentric cam 25 at a desired timing. For example, in a standby state or when a power supply is turned off, the transfer drum 5a and the photosensitive drum 1 are spaced apart from each other.

Figure 2:
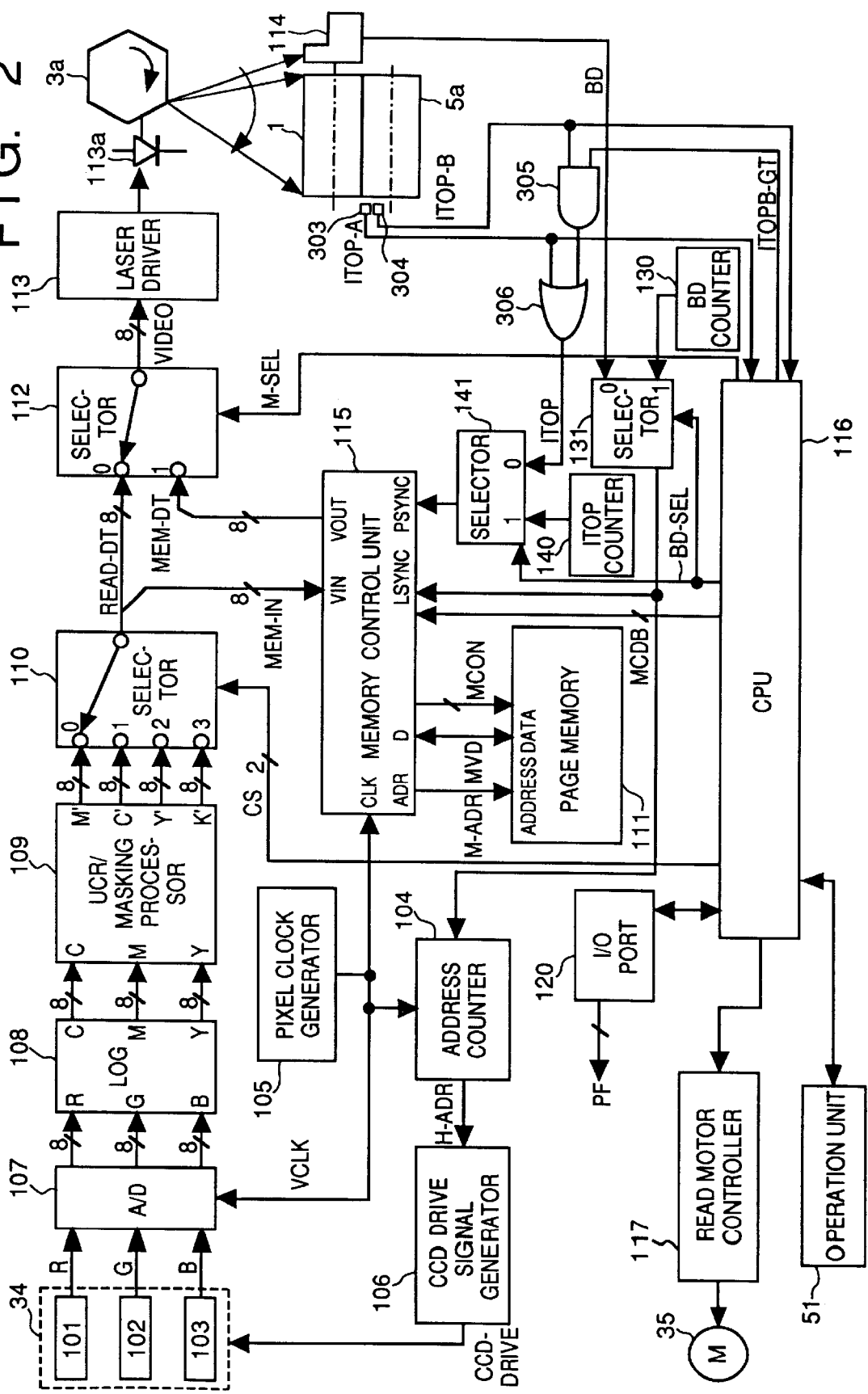
FIG. 2 is a block diagram showing the arrangement of an image processing unit, a controller unit, and their peripheral devices of the embodiment.

FIG. 2 is a block diagram showing the arrangement of the image processing unit 36, the controller 37, and their peripheral devices.

In FIG. 2, the image sensor 34 is constituted by three line CCDs 101, 102, and 103 for reading R, G, and B images, respectively. These line CCDs 101 to 103 color-separate optical information of one line reflected by an original to output R, G, and B image signals at a resolution of 400 dpi. In this embodiment, since a maximum of 297 mm (A4 longitudinal) is read as one line, each of the line CCDs 101 to 103 outputs an image signal of 4,677 pixels/line.

An address counter 104 is cleared by a signal BD which is synchronized with laser scan of each line. The address counter 104 counts an input signal VCLK from a pixel clock generator 105 and generates a count output H-ADR corresponding to each pixel of one line read by the image sensor 34. Since this signal H-ADR is counted up from 0 to 5,000, an image signal of one line can be satisfactorily read by the image sensor 34.

A CCD drive signal generator 106 decodes the signal H-ADR to generate a signal CCD-DRIVE, which is a set pulse or a transfer clock, from the shift pulse of the CCD. This allows the image sensor 34 to sequentially output R, G, and B color-separated image signals for the same pixel in synchronism with the signal VCLK.

An analog-to-digital converter (A/D) 107 converts each of the R, G, and B image signals into, e.g., an 8-bit digital signal.

A logarithmic transformer (LOG) 108 logarithmically transforms the 8-bit R, G, and B image signals to output 8-bit density signals of cyan C, magenta M, and yellow Y.

A UCR/masking processor 109 extracts a density signal of black K from the density signals of three colors C, M, and Y by well-known UCR processing. The UCR/masking processor 109 also performs a known masking arithmetic operation for removing color impurity from a developing agent corresponding to each density signal.

From the M', C', Y', and K' density signals thus generated, a selector 110 selects the density signal corresponding to a color image to be formed. A signal CS is a 2-bit signal supplied from a CPU 116 to perform this color selection. When the signal CS is 00, 01, 10, or 11, the M', C', Y', or K' signal is chosen and output as image data READ-DT.

A page memory 111 has a storage capacity of nearly an A4 size of one color.

A memory control unit 115 receives page start signals ITOP from font sensors 303 and 304 arranged near the transfer drum 5a, a line sync signal BD from a photodetector 114, and signals MCDB as various control signals from the CPU 116. The memory control unit 115 receives image data MEM-IN from the selector 110, exchanges image data MVD with the page memory 111, and outputs image data MEM-DT to a selector 112. Also, the memory control unit 115 supplies an address M-ADR and a memory control signal MCON to the page memory 111.

The selector 112 selects one of image data READ-DT obtained by processing an image signal read from an original in real time and the image data MEM-DT read out from the page memory 111 by the memory control unit 115. The selector 112 outputs the selected data as a signal VIDEO.

A laser driver 113 controls the quantity of light emission of a laser element 113a in accordance with the signal VIDEO. A laser beam emitted by the laser element 113a is scanned in the axial direction of the photosensitive drum 1 by the polygonal mirror 3a, forming an electrostatic latent image on the photosensitive drum 1.

The photodetector 114 is arranged near the photosensitive drum 1. The photodetector 114 detects passage of a laser beam immediately before it scans the photosensitive drum 1, and generates the signal BD synchronized with the laser scan.

A BD counter 130 and an ITOP counter 140 generate sync signals analogous to the signals BD and ITOP, respectively. These sync signals are used when the signals BD and ITOP are necessary although the polygonal mirror 3a is not in rotation, e.g., in writing the image data MEM-IN in the page memory 111. In this case, by switching selectors 131 and 141 by setting a signal BD-SEL from the CPU 116 to "1", the signal BD from the BD counter 130 and the signal ITOP from the ITOP counter 140 are selected. Initialization and data settings of these counters can be done by the CPU 116.

The font sensors 303 and 304 detect that the transfer drum 5a rotates to a predetermined position, and generate page sync signals ITOPA and ITOPB, respectively. An AND gate 305 ANDs the signal ITOPB and a signal ITOP-GT from the CPU 116. An OR gate 306 ORs the signal ITOPA and an output from the AND gate 305. An output ITOP from the OR gate 306 is input to the memory control unit 115 via the selector 141 and used to initialize the subscan address count value. The signals ITOP-A and ITOP-B are input to the CPU 116.

In accordance with the copy number or quantity and the operation mode, such as the size and direction of an image to be copied, designated from the operation unit 51, the CPU 116 causes a read motor controller 117 to control image read and an I/O port 120 to control image recording. That is, the read motor controller 117 controls switching between the forward and reverse rotations and the velocity of the read motor 35. The I/O port 120 relays signals required in controlling the copying operation, e.g., signals from sensors other than those discussed above or signals to actuators. The signals relayed by the I/O port 120 include a signal PF by which recording paper is fed from the recording paper cassette 7. The signals also include a recording paper size signal which is sensed by a recording paper size sensor (not shown) attached to the recording paper cassette 7.

The CPU 116 and the page memory 111 are connected by, e.g., a CPU bus. This allows the CPU 116 to directly read out data stored in the page memory 111 or to check the size or direction of a read original.

Figure 3:
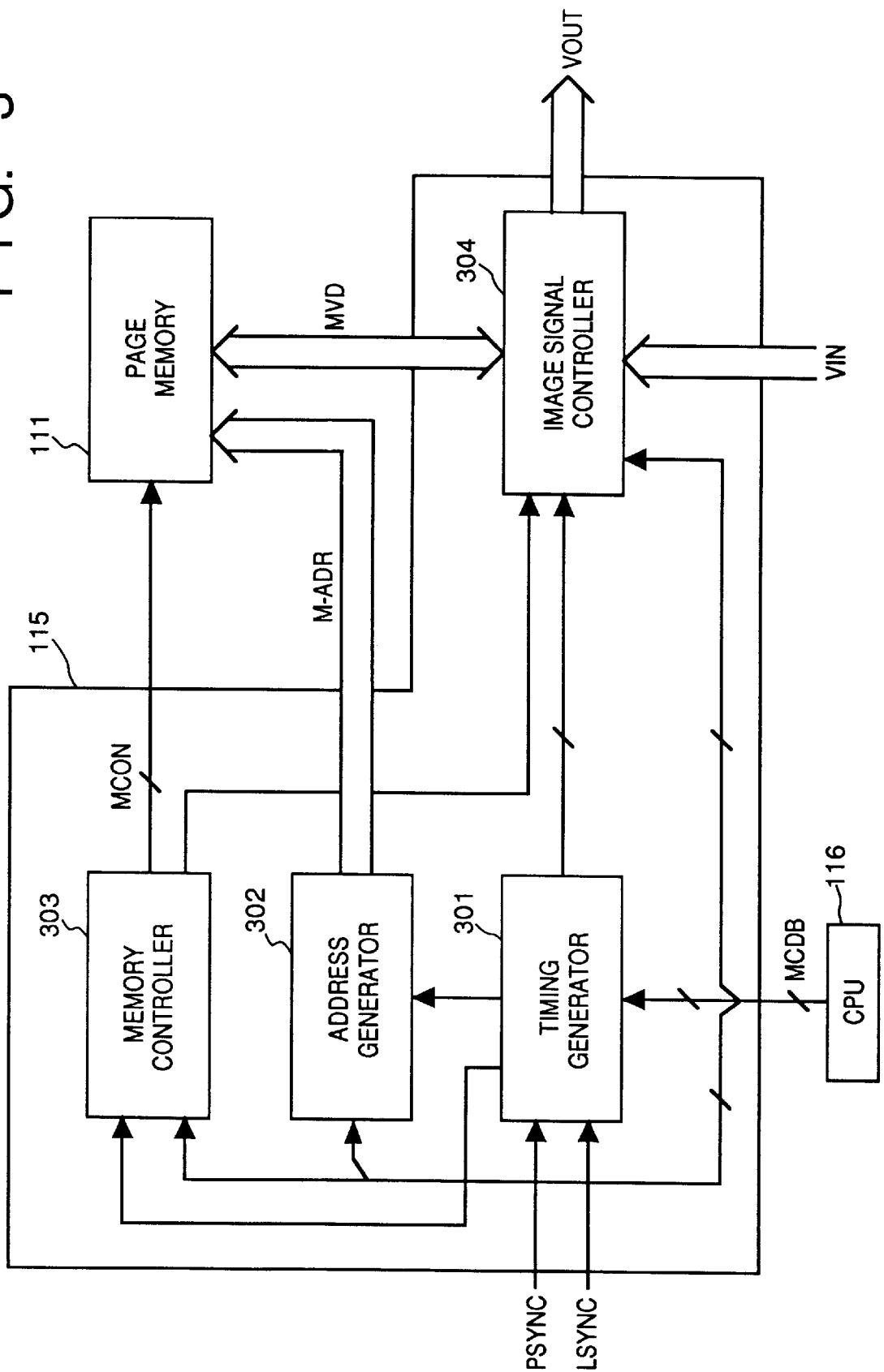
FIG. 3 is a block diagram showing the detailed arrangement of a memory control unit in FIG. 2.

FIG. 3 is a block diagram showing the details of the arrangement of the memory control unit 115.

In FIG. 3, a timing generator 301 generates enable signals or timing signals to other circuits.

An address generator 302 generates the address signal M-ADR to the page memory 111.

A memory controller 303 supplies the memory control signal MCON, which includes a signal RAS/CAS, an output enable signal OE, and a write enable signal WE, to the page memory 111.

An image signal controller 304 is a circuit for processing image data line by line. For example, the image signal controller 304 performs read/write access of image data to the page memory 111 and reverses the order of image data.

The individual blocks of the memory control unit 115 will be described in detail below.

Figure 4:
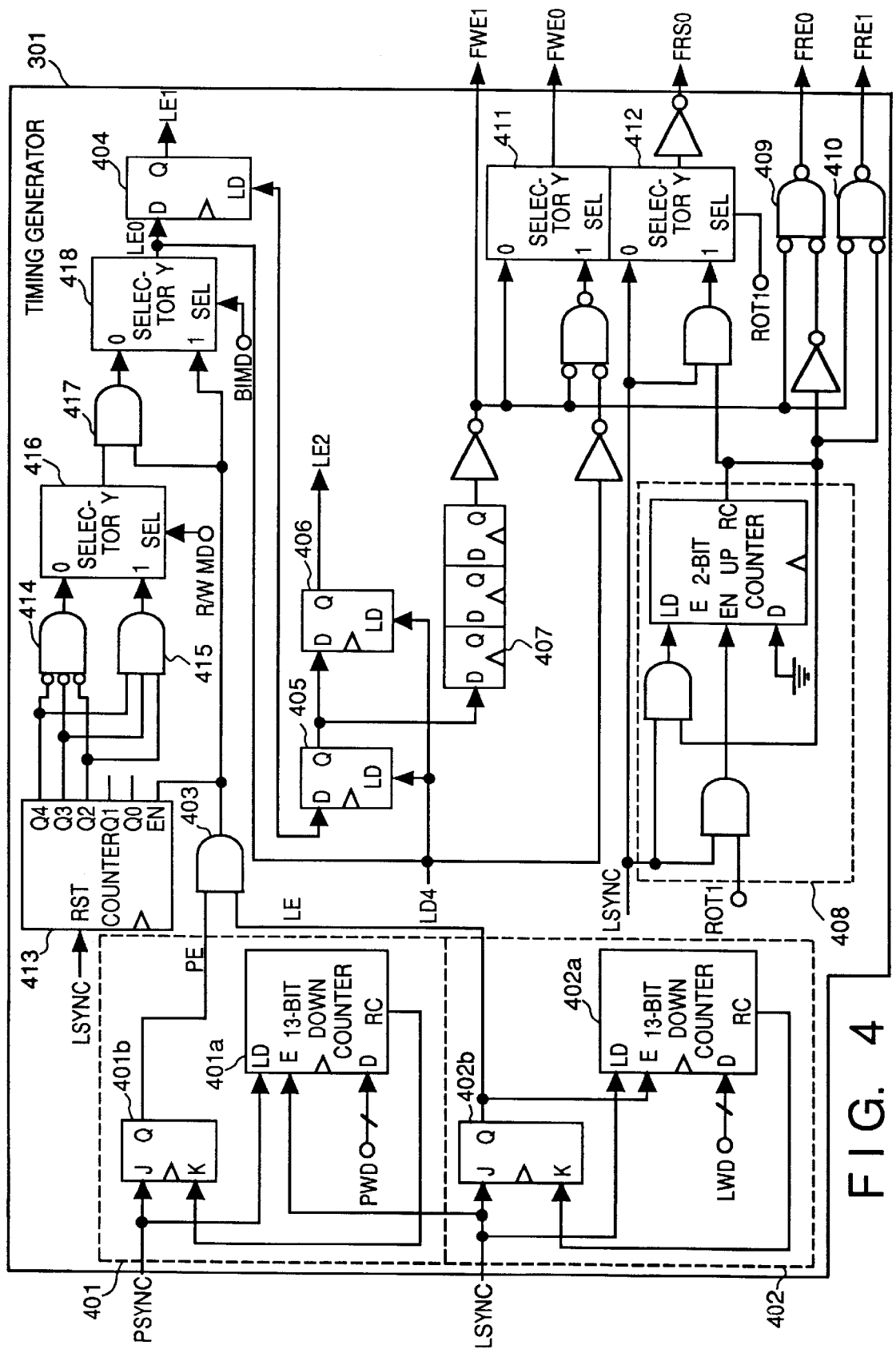
FIG. 4 is a block diagram showing the detailed arrangement of a timing generator in FIG. 3.

FIG. 4 is a block diagram showing the detailed arrangement of the timing generator 301.

In FIG. 4, a signal PSYNC is a subscan sync signal, and a signal LSYNC is a main-scan sync signal. Data PWD indicates the length of an image in the subscan direction, and data LWD represents the length of an image in the main scan direction. The data PWD and LWD are set beforehand by the CPU 116 in accordance with the size of an original.

A circuit 401 generates a subscan direction zone signal PE corresponding to the quantity of the data PWD in synchronism with the signal PSYNC. The circuit 401 is constituted by a 13-bit down counter 401a and a JK flip-flop 401b. A circuit 402 generates a main-scan direction zone signal LE corresponding to the quantity of the data LWD in synchronism with the signal LSYNC. The circuit 402 is constituted by a 13-bit down counter 402a and a JK flip-flop 402b.

An AND gate 403 ANDs the signal PE and the signal LE to output the result to a counter 413, an AND gate 417, and a selector 418.

In FIG. 4, the components from the counter 413 to the selector 418 constitute the circuit for forming a signal LE0 used in performing write/read access of a multivalued image signal and a binary image signal to the memory 111 in this embodiment as will be described later.

The counter 413 is reset to start counting by the signal LSYNC immediately after the output from the AND gate 403 goes HIGH. Consequently, three upper bits are applied to a NAND gate 414 and an AND gate 415. With this arrangement, a signal in which the first four clocks of the 32 clocks are HIGH is obtained from the gate 414, and a signal in which the last four clocks of the 32 clocks are HIGH is obtained from the gate 415.

A selector 416 selectively outputs these signals in accordance with a signal R/WMD. That is, the signal R/WMD is set by the CPU 116 when the write or read mode of the memory is set. When the signal R/WMD is "0", the memory read mode is set, and the selector 416 outputs the signal from the terminal 0.

When the signal R/WMD is "1", the memory write mode is set, and the selector 416 outputs the signal from a terminal 1.

The output from the selector 416 is gated by the AND gate 417 and applied to a terminal 1 of the selector 418.

The selector 416 selects a signal in accordance with a signal BIMD. That is, the signal BIMD is supplied from the CPU 116 in performing write/read access of a binary image signal (to be described later) to the memory. When the signal BIMD is "1", the signal from the terminal 1 is transferred to process a binary image signal. When the signal BIMD is "0", the signal from the terminal 0 is transferred to process a multivalued image signal.

In this fashion, the signal LE0 corresponding to the image signal processing to be performed is output.

Each of flip-flops 404 to 406 holds an immediately preceding value when a signal LD4 is "0", and outputs an input signal in synchronism with the clock when the signal LD4 is "1". Note that the signal LD4 is generated by, e.g., a 2-bit counter (not shown) and goes to "1" every four clocks. That is, a signal LE1 is formed by delaying the signal LE0 by four clocks, and a signal LE2 is formed by delaying the signal LE0 by eight clocks.

A flip-flop 407 consists of three flip-flops in cascade. A signal FWE1 is formed by delaying the signal LE0 by seven clocks and inverting the signal.

A circuit 408 controls line rotation. The circuit 408 outputs "0" when a signal ROT1 is "0", and outputs "1" for one of four lines in synchronism with the signal LSYNC when the signal ROT1 is "1". Note that the signal ROT1 is a line rotation control signal which is set by the CPU 116.

A signal FRE0 as an output from an AND gate 409 is normally disabled, i.e., "1". Upon line rotation, three out of the four lines change to the same value as the signal FWE1, and the remaining one line remains disabled, i.e., "1". A signal FRE1 as an output from an AND gate 410 normally has the same value as the signal FWE1. Upon line rotation, only one of the four lines remains enabled, i.e., at the same value as the signal FWE1, and the remaining three lines are disabled, i.e., go to "1". A signal FWE0 normally takes the same value as the signal FWE1. Upon line rotation, the signal FWE0 is enabled every four clocks by the selector 411. A signal FRS0 normally has the same value as the signal LSYNC. Upon line rotation, the selector 412 outputs "1" in synchronism with the signal LSYNC only for one of the four lines.

Note that a controller for refreshing the DRAM is omitted from FIG. 4 for simplicity.

Figure 5:
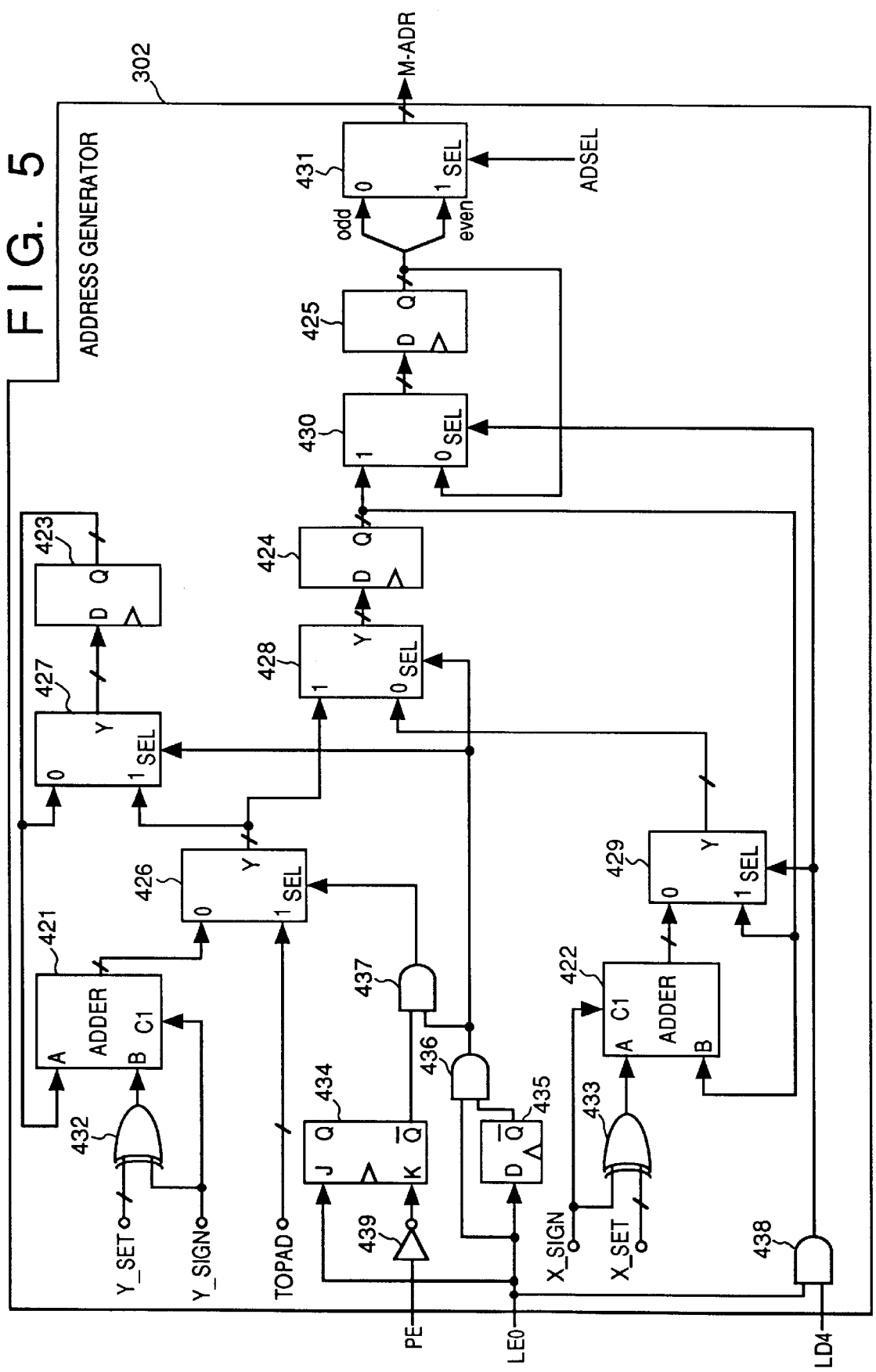
FIG. 5 is a block diagram showing the detailed arrangement of an address generator in FIG. 3.

FIG. 5 is a block diagram showing the detailed arrangement of the address generator 302.

In FIG. 5, signals TOPAD, X_SET, X_SIGN, Y_SET, and Y_SIGN are set by the CPU 116. The signal TOPAD indicates the start address of an image, the signal X_SET indicates the address difference between pixels in the main scan direction, and the signal X_SIGN indicates an increase/decrease in the address difference. The signal Y_SET is indicative of the address difference between lines in the subscan direction, and the signal Y_SIGN is indicative of an increase/decrease in the address difference. Not that the signals X_SIGN and Y_SIGN represent the sign "+" when they are "0", and represent the sign "−" when they are "1".

Reference numerals 421 and 422 denote, e.g., 23-bit adders which also serve as subtracters in accordance with the values of the signals X_SIGN and Y_SIGN. That is, a gate 432 obtains exclusive OR of the signals Y_SET and Y_SIGN, and a gate 433 obtains exclusive OR of the signals X_SET and X_SIGN. Upon receiving these results, the adders 421 and 422 perform addition or subtraction.

Reference numerals 423 to 425 denote, e.g., 23-bit flip-flops (to be referred to as "F/Fs" hereinafter); and 426 to 431, selectors. In performing read/write access to the conventional page memory 111, settings are TOPAD="0", X_SET="1", X_SIGN="0", Y_SET=the number of pixels in main scan, and Y_SIGN="0".

The flow of the processing will be described below.

When the signal LE0 becomes "1" for the first time after the signal PE is put to "1" by the F/Fs 434 and 435 and the gates 436 and 437, the value of the signal TOPAD is applied to the F/F 423 via the selectors 426 and 427. Simultaneously, the value of the TOPAD is applied to the F/F 424 via the selector 428. At this time the signal LD4 is "0".

At the next clock, the output value from the F/F 424 is again applied to the F/F 424 via the selectors 429 and 428, and so the output value remains unchanged.

When the signal LD4 goes to "1" at the fourth clock, the F/F 424 outputs an address value to the F/F 425, and at the same time the adder 424 adds the value of the signal X_SET to the address and outputs the result to the F/F 424. The output from the F/F 425 is divided into even bits and odd bits. The selector 431 selectively outputs these bits as the address signal MADR to the page memory 111 in accordance with the signal ADSEL. In processing a multivalued image signal, the value of the signal X_SET is added to the address each time the signal LD4 becomes "1". In processing a binary image signal, on the other hand, the address is updated every 32 clocks.

When the signal LE0 again goes to "1" on the next line, the output from the adder 421, i.e., the sum of the signals TOPAD and Y_SET is input to the F/F 424 via the selectors 426 and 428. Here again, the address value is added with the value of the signal X_SET every four or 32 clocks and output.

As described above, the page memory 111 can be freely accessed by setting the values of the signals TOPAD, X_SET, X_SIGN, Y_SET, and Y_SIGN.

Figure 6:
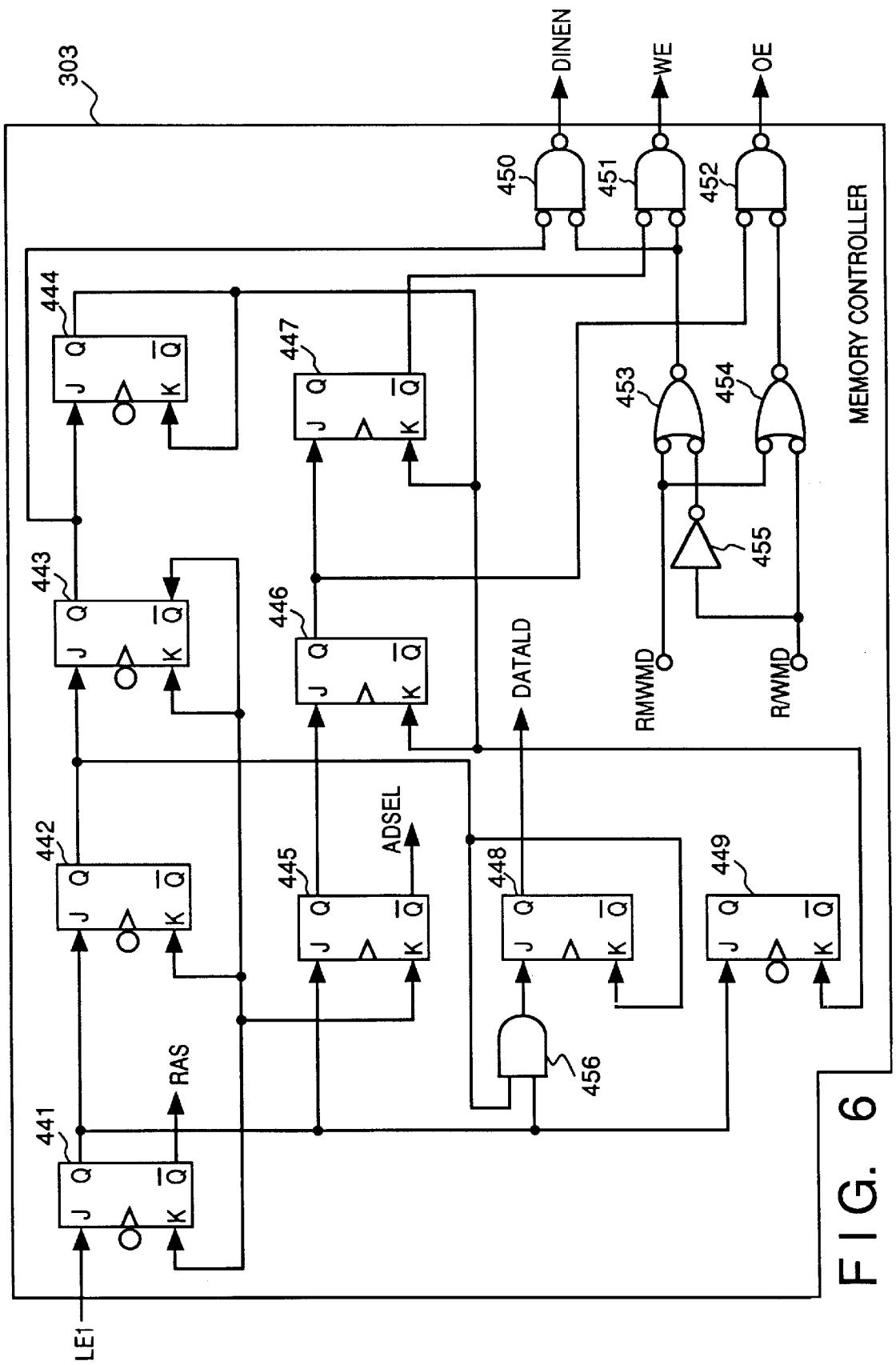
FIG. 6 is a block diagram showing the detailed arrangement of a memory controller in FIG. 3.
Figure 7:
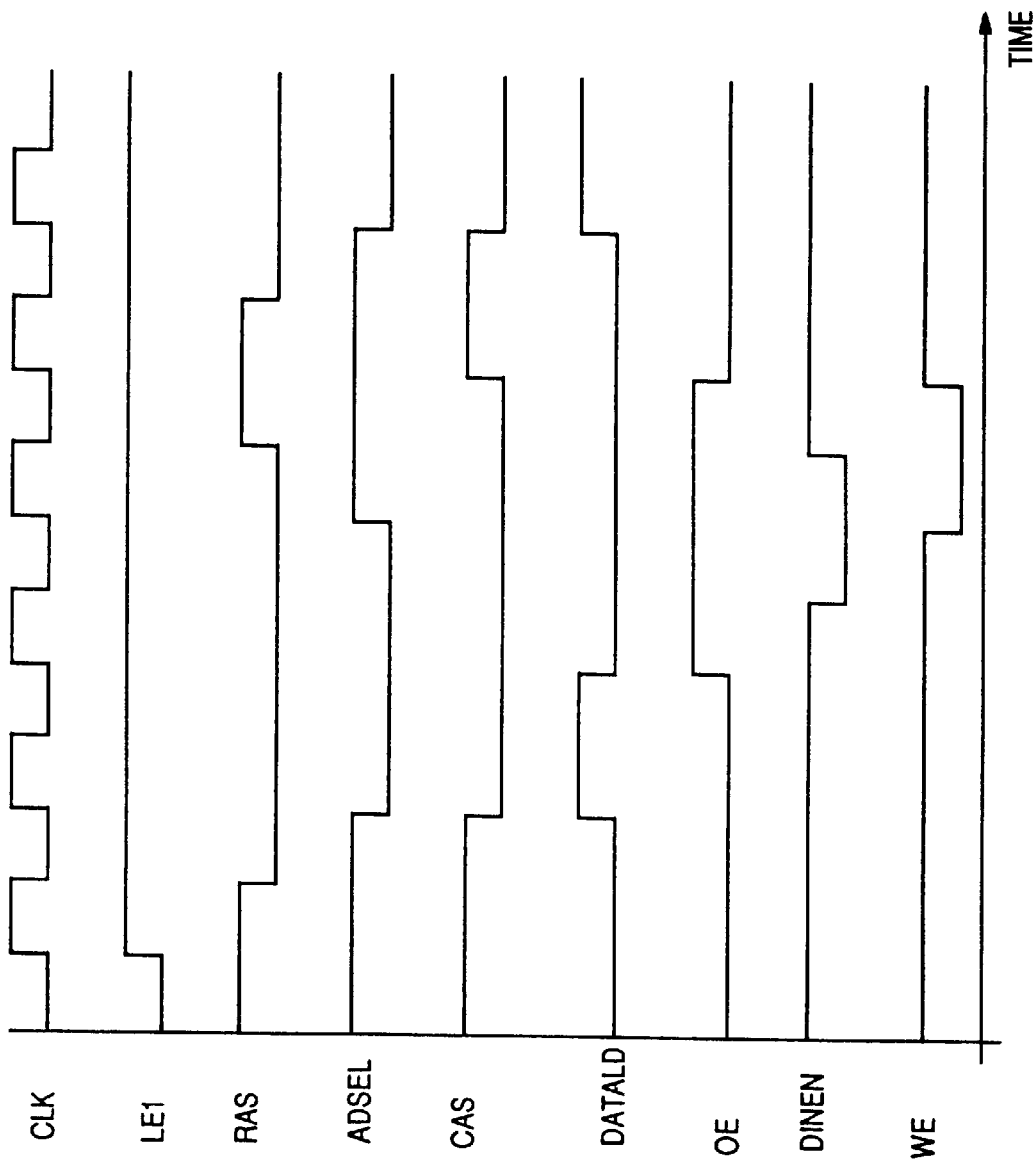
FIG. 7 is a timing chart showing the states of signals of the individual parts in FIG. 6.
Figure 8:
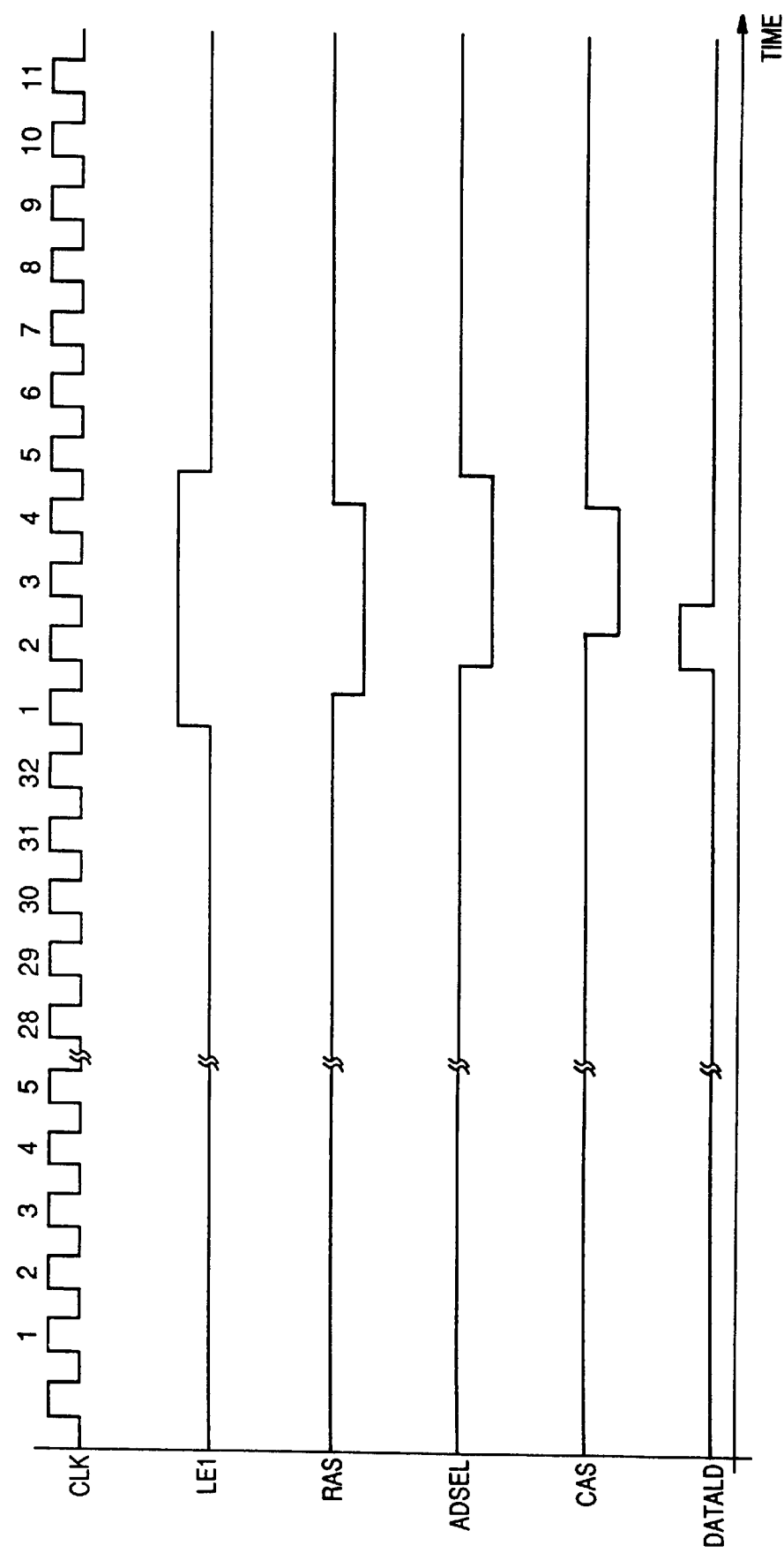
FIG. 8 is a timing chart showing the states of signals of the individual parts in FIG. 6.

FIG. 6 is a block diagram showing the details of the configuration of the memory controller 303. FIGS. 7 and 8 are timing charts showing the timings of the output signals from the memory controller 303.

Of F/Fs 441 to 449, the F/Fs 441 to 444 receive an inverted clock CLK, and the F/F 441 also receives the signal LE1. Output signals RAS and CAS from the F/Fs 441 and 449, respectively, form the signal RAS/CAS to be supplied to the page memory 111. An output signal DATALD from the F/F 448 is input to the image signal controller 304 to determine the timing at which an image signal read out from the page memory 111 is supplied to the F/F. An output signal ADSEL from the F/F 445 is input to the address generator 302 to perform switching between memory addresses. In this embodiment, one address is given every four pixels for a multivalued signal, and every 32 pixels for a binary signal.

An output signal DINEN from a gate 450 is used to switch the directions of a bidirectional buffer between the page memory 111 and the image signal controller 304. Output signals OE and WE from gates 451 and 452 are an output enable signal and a write enable signal, respectively.

Signals R/WMD and RMWMD applied to gates 453 and 454, respectively, are register signals set by the CPU 116. When the signal R/WMD is "0", a memory read mode is set, in which mode the signal WE is disabled. When the signal R/WMD is "1", a memory write mode is set, in which mode the signal OE is disabled. When the signal RMWMD is "0", a read modify write mode is set, in which data is read out from the memory and immediately another data is written in the same address. In this mode both the signals WE and OE are enabled.

FIG. 7 is the timing chart showing the states of the signals of the individual parts in FIG. 6 in processing multivalued image signals.

As can be seen from FIG. 7, the signals RAS, CAS, and DATALD go to high level every four clocks. In this embodiment, in processing multivalued image signals, write/read access to the memory is performed in units of four pixels (4×8 bits=32 bits).

FIG. 8 is the timing chart showing the states of the signals of the individual parts in FIG. 6 in processing binary image signals.

As can be apparent from FIG. 8, the signals RAS, CAS, and DATALD rise to high level every 32 clocks. In this embodiment, in processing binary image signals, write/read access to the memory is performed in units of 32 pixels (32×1 bit=32 bits).

Figure 9:
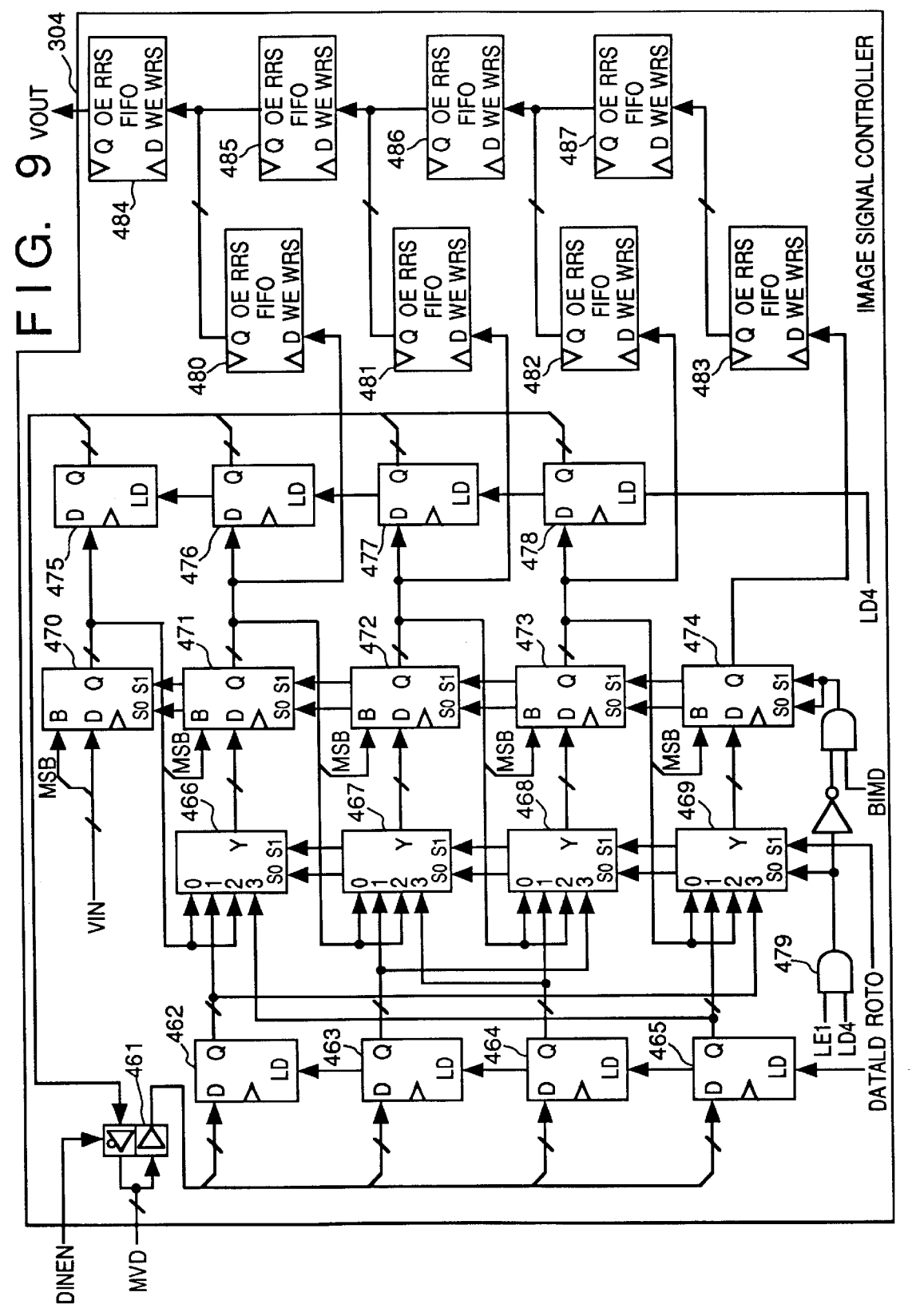

FIG. 9 is a block diagram showing the details of the configuration of the image signal controller 304.

Figure 10:
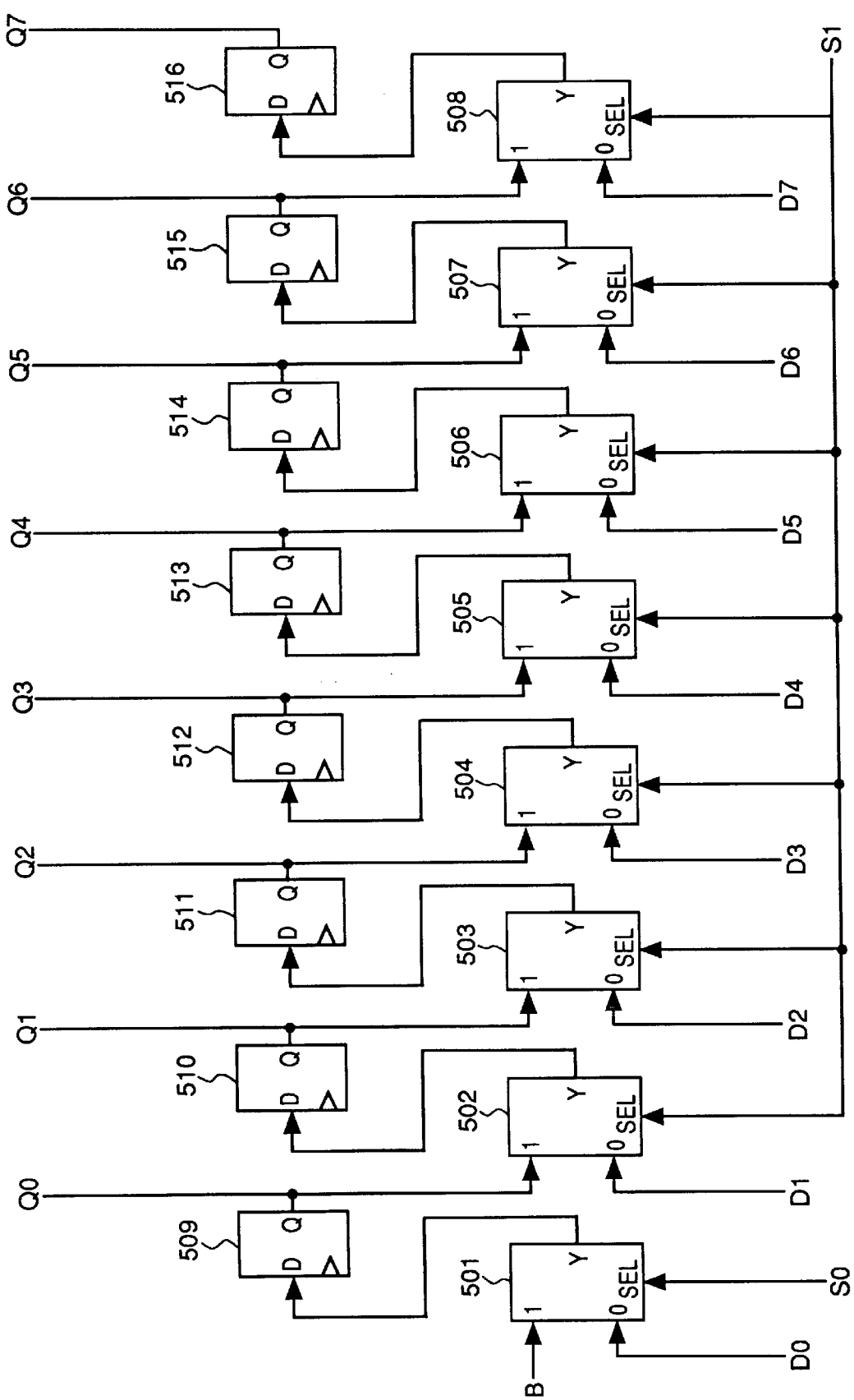
FIG. 10 is a block diagram showing the detailed arrangement of an F/F 470 in FIG. 9.

In FIG. 9, reference numerals 462 to 465 and 470 to 478 denote F/Fs. Each of the F/Fs 462 to 465 and 475 to 478 outputs an input signal in synchronism with the signal CLK when a terminal LD is "1", and holds an immediately output signal when the terminal LD is "0". The operations of the F/Fs 470 to 474 change in accordance with select signals S0 and S1. FIG. 10 is a block diagram showing the detailed arrangement of the F/Fs 470 to 474.

In FIG. 10, reference numerals 509 to 516 denote F/Fs; and 501 to 508, selectors. In processing a multivalued image signal, the select signals S0 and S1 are "0", and image signals D0 to D7 are output from Q0 to Q7 in synchronism with the clock CLK.

When the signal BIMD goes to "1", the select signals S0 and S1 change in accordance with the output from the AND gate 479. That is, in processing a binary image signal, the signals LE1 and LD4 go to "1" only for the period of four out of 32 clocks and the period of one out of four clocks, respectively, as discussed earlier. Consequently, the select signals S0 and S1 go to "1" only for the period of one out of 32 clocks.

The F/Fs illustrated in FIG. 10 operate as discussed above. Therefore, when binary image signals (1 bit) of 32 pixels are input, data of 32 pixels are simultaneously output from Q0 to Q7 of the F/Fs 470 to 473 to the F/Fs 475 to 478.

Referring back to FIG. 9, each of selectors 466 to 469 outputs one of the four inputs in accordance with the combination of the select signals S0 and S1. That is, each selector outputs an input signal to a terminal 0 when S1S0 is "00", an input signal to a terminal 1 when S1S0 is "01", an input signal to a terminal 2 when S1S0 is "10", and an input signal to a terminal 3 when S1S0 is "11".

Reference numerals 480 to 487 denote line memories (to be referred to as "FIFOs" hereinafter) having a memory capacity of about 5,000 pixels.

A signal VIN is an externally input image signal, and a signal VOUT is an image signal to be output to an external device. A signal MVD is an image signal exchanged with the page memory 111 via a bidirectional buffer 461.

Signals VIN and VOUT are 8-bit parallel input and output, respectively, for a multivalued image signal, and are 1-bit input and output, respectively, for a binary image signal.

Write/read access of a multivalued image signal to a common memory performed in the arrangement as discussed above will be described below.

To write multivalued image data in the page memory 111, the image signal VIN is externally applied in an 8-bit parallel manner to the F/F 470 in synchronism with the clock CLK. At this time, the signal LD4 is "0", and the selectors 466 to 469 select the terminals 0. The image signal is transferred from the F/F 470 to the F/Fs 471, 472, and 473 in synchronism with the clock CLK. When an image signal of four pixels is applied, the signal LD4 becomes "1", and the image signals passing through the F/Fs 470 to 473 are output from the F/Fs 475 to 478 to the page memory 111 as the signal MVD via the bidirectional buffer 461.

In the above processing, the data are transmitted parallel in units of 4×8 bits=32 bits from the F/Fs 475 to 478 to the page memory 111 via the bidirectional buffer 461. The data are written in the memory in units of four pixels (32 bits) as will be described later.

To read out image data from the page memory 111, four pixels of the image signal MVD simultaneously read out via the bidirectional buffer 461 are input in a one-to-one correspondence to the F/Fs 462 to 465 and output when the signal DATALD is "1".

That is, it is already determined which of the four pixels read out at the same time is to be input to which of the F/Fs 462 to 465.

The output image signals from the F/Fs 462 to 465 are selected by the selectors 466 to 469 when the signal LD4 is "1". The four pixels are simultaneously input to the F/Fs 471 to 474.

When the signal LD4 changes to "0", S0 of each of the F/Fs 466 to 469 goes to "0", and the image signal is output from the F/F 474 to the FIFO 483 in synchronism with the clock CLK. Consequently, the image signal is transferred from the F/F 473 to the F/F 474. In a similar fashion, the image signal is output pixel by pixel to the FIFO 483. The FIFO 483 stores an image signal of one line and at the same time outputs the image signal to the FIFO 487. In this case, the signals OE and WE are enabled to execute the read/write access to the FIFO only in a period during which the line enable signal LE is "1". In addition, in synchronism with the signal LSYNC which is generated once for each line, a read reset signal RRS and a write reset signal WRS are input.

In the same manner as described above, the image signal is supplied to the FIFOs 487 to 484 with a delay of one line each. Note that, at this time, no signal is output from the FIFOs 480 to 482.

In this manner, four pixels of a multivalued image signal are simultaneously written in or read out from the page memory 111, substantialy reducing a memory access time. This makes high-speed image processing feasible.

Write/read access of a binary image signal to a common memory will be described next.

As discussed above, a multivalued image signal is written in or read out from the memory in units of four pixels. On the other hand, write/read access of a binary image signal to the memory is performed in units of 32 pixels. This is so because write/read access of a multivalued image signal to the memory is performed in units of 4 pixels×8 bits=32 bits, and 32 pixels×1 bit equals 32 bits in the case of a binary signal. Consequently, write/read access of a binary image signal can be performed in units of the same bits as in the case of a multivalued signal.

To write binary image data in the page memory 111, the externally input binary image signal VIN is applied bit by bit to the F/F 470 in synchronism with the clock CLK. In this case, both the signals S0 and S1 are "0", and so each of the selectors 466 to 468 selects the terminal 0. Consequently, the input data is supplied to the F/Fs 470 to 473 in sequence in synchronism with the clock CLK.

When an image signal of 32 pixels is input, the output from the AND gate 479 rises to "1", and the image signals passed through the F/Fs 470 to 473 are output from the F/Fs 475 to 478 to the page memory 111 as the signal MVD via the bidirectional buffer 461 as mentioned earlier.

In the above processing, the F/Fs 475 to 478 output the data in synchronism with the signal LD4, i.e., the F/Fs 475 to 478 update the data in the period of one out of four clocks. As described above, write access to the memory 111 is controlled by the signals RAS and CAS. Therefore, in the period of one out of 32 clocks, i.e., when the data of 32 pixels is input to the F/Fs 470 to 473, the data is written in the memory 111.

To read out the image data from the page memory 111, 32 pixels of the image signal MVD simultaneously read out via the bidirectional buffer 461 are input to the F/Fs 462 to 465 8 bits each and output when the signal DATALD is "1", i.e., in the period of one out of 32 clocks.

The output image signals from the F/Fs 462 to 465 are selected by the selectors 466 to 469 at the timing at which the output from the AND gate 479 goes to "1", and are simultaneously input to the F/Fs 471 to 474.

When the output from the AND gate 479 changes to "0", S0 of each of the F/Fs 466 to 469 becomes "0". Consequently, the image signal is output one pixel after another from the F/F 474 to the FIFO 483 in synchronism with the clock CLK, and at the same time the image signal of the F/F 473 is transferred to the F/F 474. In a similar fashion, the image signal is output pixel by pixel (bit by bit) to the FIFO 483.

When the image data of 32 pixels is output to the FIFO 483 as discussed above, the output from the AND gate 479 again rises to "1", and image data of another 32 pixels is applied to the F/Fs 471 to 474.

Writing a multi-gradation-level image signal as a binary image signal in the page memory 111 as described above makes it possible to write, e.g., eight pages of an A4-size image at the same time.

The flow of an image signal when an image is to be rotated will be described below.

In rotating pixels, a signal ROTO goes to "1", and each of the selectors 466 to 469 selects the terminal 2 or 3. The image signal MVD read out from the page memory 111 is applied to the F/Fs 462 to 465. When the signal LD4 goes to "1", each of the selectors 466 to 469 selects the terminal 3. Consequently, the outputs from the F/Fs 462, 463, 464, and 465 are supplied to the F/Fs 474, 473, 472, and 471, respectively. By outputting the image signals starting with the one from the F/F 474, it is possible to reverse the order of outputs in units of four pixels, in the case of a multivalued signal, and in units of 32 pixels, in the case of a binary signal.

In performing line rotation, the image signal MVD read out from the page memory 111 is output to the F/Fs 471 to 474 via the F/Fs 462 to 465 and the selectors 466 to 469, when the signal LD4 is "1" in the case of a multivalued signal, and when the output from the AND gate 479 is "1" in the case of a binary signal. When the signal LD4 or the output from the AND gate 479 again rises to 1, the image signals are written from the F/Fs 471 to 474 into the FIFOs 480 to 483.

Each of the FIFOs 480 to 483 outputs the image signal to the corresponding one of the FIFOs 484 to 487 in the period of one out of four lines.

In the period of the remaining three lines, the FIFOs 484 to 487 sequentially output data pixel by pixel starting with the FIFO 484. When an image signal of three lines is completely output, i.e., when the image signals stored in the FIFOs 485 to 487 are completely output, new data are input from the F/Fs 480 to 483.

In this manner, write/read access to the FIFOs 484 to 487 is performed in units of lines at all times. That is, rotation is possible in units of lines.

Image processing control using a memory in processing a multivalued image signal will be described below.

Figure 11:
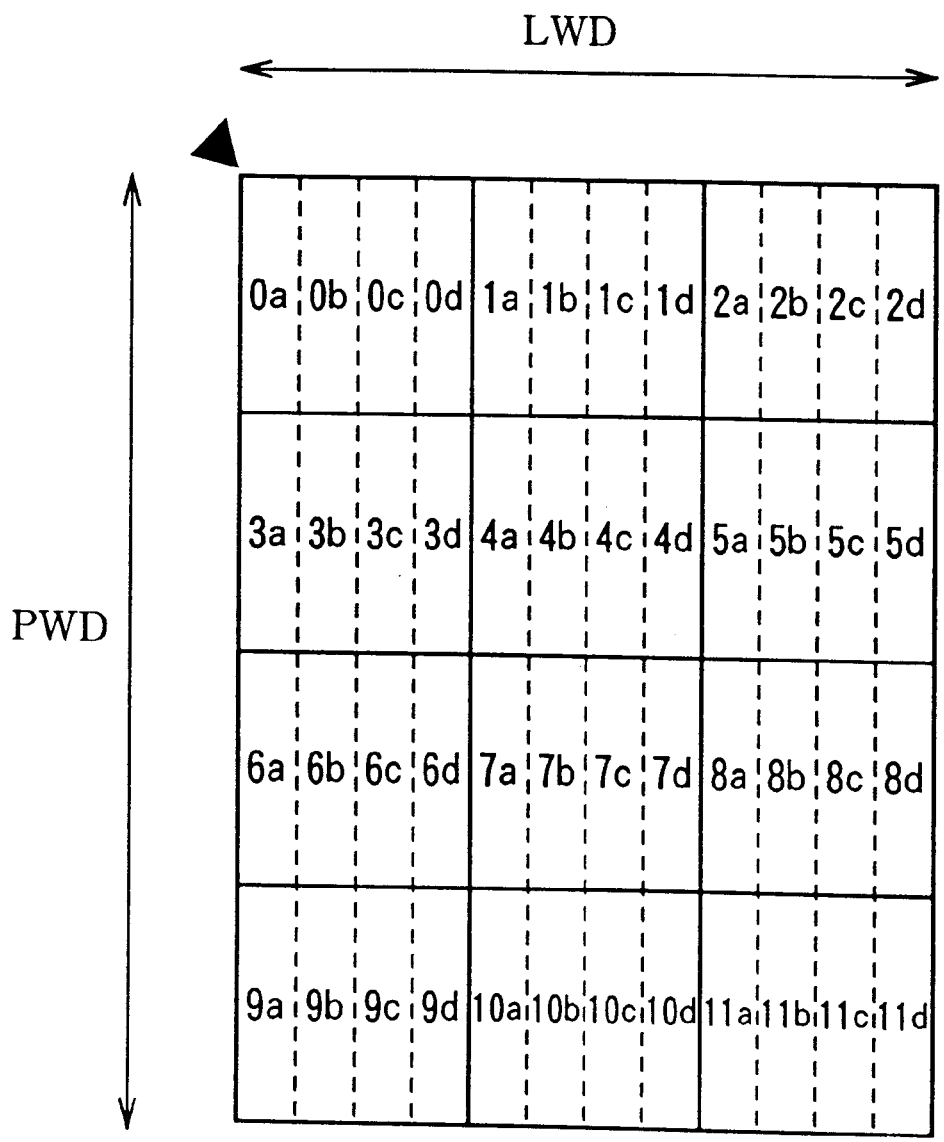
FIG. 11 is a view showing an original to be read.

FIG. 11 is a view showing an original to be read, in which PWD represents the number of pixels in the subscan direction, and LWD represents the number of pixels in the main scan direction. For simplicity, it is assumed that this original is a monochromatic original whose page consists of 12×4=48 pixels as illustrated in FIG. 11. Note that in this embodiment, since the original is written in the page memory 111 in units of four pixels as a multivalued image signal, the number of addresses of the page memory 111 is 48/4=12.

Figure 12:
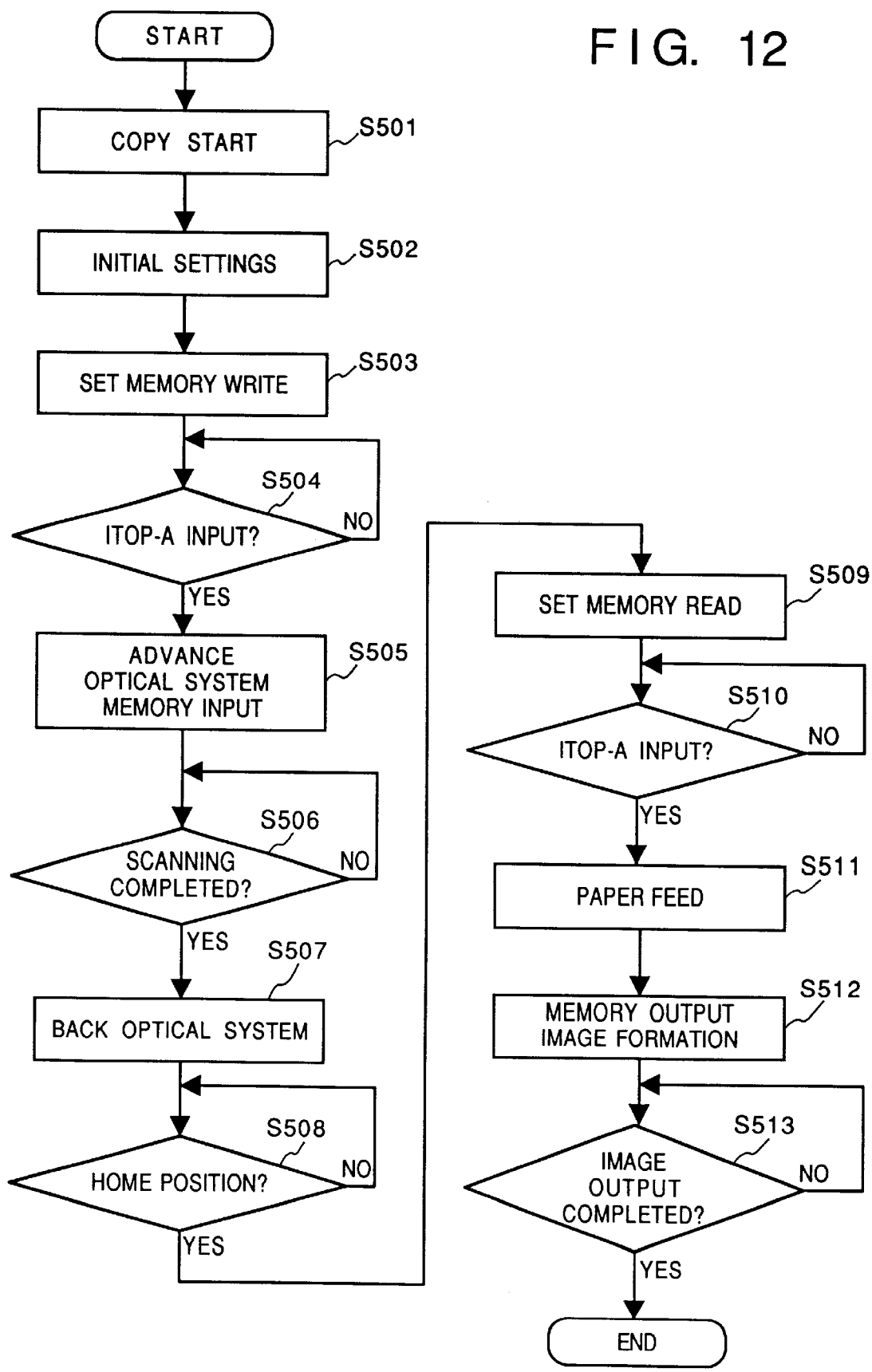
FIG. 12 is a flow chart showing the image processing control of this embodiment.

FIG. 12 is a flow chart showing the image processing control.

In step S501, the original is placed on the original table glass 31, and the copy start key of the operation unit 51 is depressed. Consequently, initial settings are performed in step S502. Since this copying is monochromatic copying, the signal CS of the CPU 116 changes to "1", and the selector 110 selects the signal K. The signal M-SEL goes to "1", and the selector 112 selects the data MEM-DT from the page memory 111. The signal ITOPB-GT is "0".

In step S503, the CPU 116 sets the signals given in the column a of FIG. 13, setting the memory control unit 115 in the memory write mode. In FIG. 13, X represents the quarter of the pixel number LWD in the main scan direction (X=LWD/4), and Y represents the pixel number PWD in the subscan direction (Y=PWD).

When a signal ITOP-A is input in step S504, the optical system moves forward to write the image signal in the page memory 111 in step S505. At this time, the image signal is input to the memory control unit 115 in order of pixels 0*a*, 0*b*, 0*c*, 0*d*, 1*a*, 1*b*, 1*c*, 1*d*, 2*a*, . . . illustrated in FIG. 11. The memory control unit 115 simultaneously writes four adjacent pixels of data in the page memory 111.

In step S506, the original scan is completed to finish reading the original. The optical system is moved backward in step S507 and returned to the home position in step S508. In step S509, the CPU 116 sets the signals given in the column b of FIG. 13, setting the memory control unit 115 in the memory read mode.

When the signal ITOP-A is input in step S510, recording paper is fed in step S511. In step S512, the image data MEM-DT is output from the page memory 111, and an image is formed by the printer section. In this case, the pixels 0*a* to 0*d* of the data are read out from the page memory 111 at once, and the memory control unit 115 outputs the data pixel by pixel in order of 0*a*, 0*b*, 0*c*, 0*d*.

Thereafter, the data is output in order of

1*a*, 1*b*, 1*c*, 1*d*, 2*a*, . . .

When the image data output is completed in step S513, the processing is ended.

Note that, by repeatedly executing steps S509 to S513, a plurality of copies can be made by reading the original only once.

An operation in which an image signal read from the original is rotated 90° counterclockwise and output will be described below.

The original is read and the read image signal is written in the page memory 111 following the same procedure as above from steps S501 to S508 in FIG. 12.

Subsequently, in step S509, the CPU 116 sets the signals shown in the column c of FIG. 13, thereby setting the memory control unit 115 in the rotational read mode. Following the same procedure as above from steps S510 to S513, memory read access and image formation are executed.

The flow of the image signal in this case is as follows. First, the pixels 2*a* to 2*d* of the data are read out from the page memory 111 and written in the FIFOs 483 to 480, FIG. 9. Subsequently, the pixels 5*a* to 5*d* of the data are similarly written in the FIFOs 483 to 480. When the pixels 11*a* to 11*d* of the data are written in the FIFOs 483 to 480, the FIFO 483 outputs the pixels 2*d*, 5*d*, 8*d*, and 11*d* of the data, and the FIFO 481 outputs the pixels 2*c*, 5*c*, 8*c*, and 11*c* of the data. Eventually, the memory control unit 115 outputs the data in order of 2*d*, 5*d*, 8*d*, 11*d*, 2*c*, 5*c*, 8*c*, 11*c*, . . . , thereby forming an image rotated through 90°.

With this processing, even if an A4-size original is placed laterally on the original table glass 31 and there is no A4R-size recording paper cassette, copying can be performed by using recording paper of the A4-size recording paper cassette. That is, the CPU 116 detects the set recording paper cassette (or the type or direction of recording paper) beforehand from the output recording paper size signal from the recording paper size sensor. Therefore, in accordance with the relationship between the size or direction of an original placed on the original table glass 31 and the usable recording paper, the CPU 116 performs control such that copying is executed by the most favorable method.

In addition, since A4 is shorter than A4R in the subscan direction, an output interval of sheets of recording paper can be decreased. This advantageously increases the throughput in outputting a plurality of copies.

Furthermore, rotations of 180° and 270° also can be done in the same manner as discussed above.

That is, after steps S501 to S508 in FIG. 12 are executed following the same procedure as discussed above, the settings of the column a in FIG. 14 are performed in step S509. The result is a rotation of 180°.

The flow of the image signal at this time is as follows. First, the pixels 11*a* to 11*d* read out from the page memory 111 are applied to the F/Fs 462 to 465 in FIG. 9. Since each of the selectors 466 to 469 selects the terminal 3, the order of the image signals is reversed. Consequently, the pixels are output in order of 11*d*, 11*c*, 11*b*, 11*a*, 10*d*, . . . , thereby forming an image rotated through 180°.

A rotation of 270° is effected by performing the settings in the column b of FIG. 13 in step S509. This 270° rotation is realized by the combination of the line rotation and the pixel rotation.

Note that it is naturally possible to readily realize image processing such as reversal or mirror image processing by variously setting the data in the column b of FIG. 9.

The operations for rotating a multivalued image signal have been discussed above. A binary image signal is rotated in basically the same fashion as for a multivalued image signal except that the rotation is done in units of 32 pixels.

All the operations discussed so far are related to equal-magnification copying. However, the combination of rotations can also be used in copying an A3-size original onto A4-size recording paper by reduction.

Figure 15:
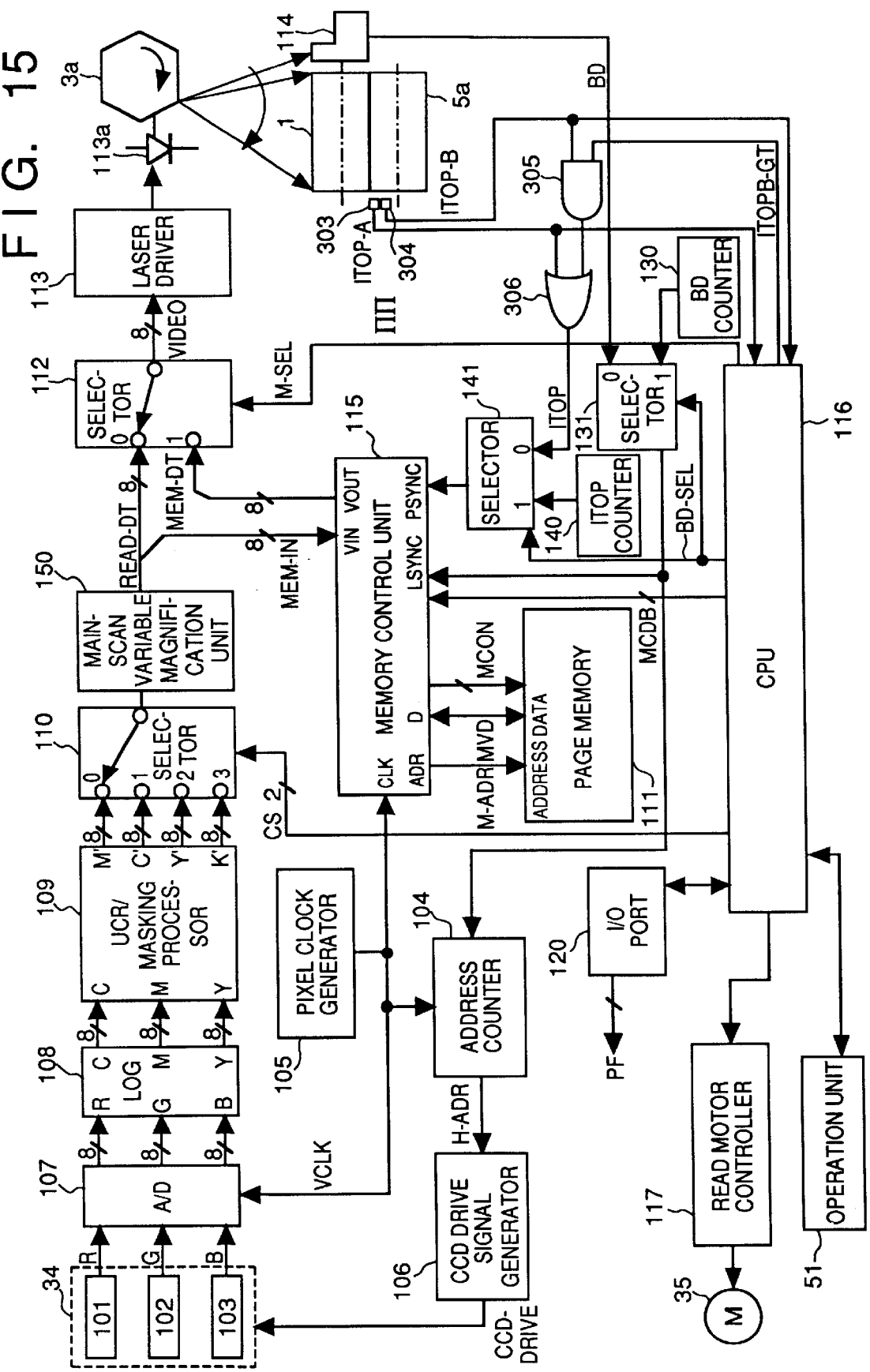
FIG. 15 is a block diagram in which a main-scan variable magnification unit is added to the arrangement in FIG. 2.

In FIG. 15, a main-scan variable magnification unit 150 is a well-known circuit for performing enlargement and reduction in the main scan direction. Note that the remainder of the arrangement is the same as that in FIG. 2, and a detailed description thereof will be omitted.

Variable magnification in the subscan direction is effected by changing the scanning speed of the optical system; i.e., increasing the scanning speed of the optical system results in reduction, and decreasing the scanning speed results in enlargement. It is also possible to realize reduction in the subscan direction by thinning image data when the data is written in the page memory 111, and to realize enlargement in the subscan direction by interpolating two successive image data when the data are read out from the page memory 111.

The processing is performed in the same manner as above from steps S501 to S508 in FIG. 12. The image data is, for example, reduced from A3 size to A4 size and written in the page memory 111 by reduction in the main scan direction performed by the main-scan variable magnification circuit 150 and reduction in the subscan direction done by changing the scanning speed of the optical system.

In step S509, a rotation of, e.g., 90° is realized by performing the settings in the column c of FIG. 13.

In this manner, in copying an A3-size original by reducing it to an A4 copy size, for example, the copy operation can be performed by using recording paper of the A4-size recording paper cassette by rotating the image 90°, without using an A4R-size recording paper cassette. Likewise, the 90° rotation is possible in copying an A4-size original onto A3-size recording paper by enlargement. This allows the copy operation regardless of the direction of an original placed on the original table glass 31.

It is also possible to perform copying by using only one of magenta, cyan, and yellow. This copying with a desired color is made feasible by setting the signal CS to one of "00" to "10" in FIG. 2.

In addition, a multivalued image signal can be converted into a binary image signal for each color component, i.e., magenta, cyan, yellow, and black, and written in the page memory 111. In this case, it is possible to write a binary image signal of a four-color A3 size in the page memory 111 with a capacity of a monochromatic, 256-gradation-level A4 size. In this binarization, it is also possible to extract one particular color signal and write it in the page memory 111 in accordance with the settings of the binarization threshold values of the individual color components. Furthermore, preliminary scanning can be performed to read color and gradation information prior to reading an original. If it is determined that the original image is a monochromatic binary image, the image is converted into a binary image signal and written in the page memory 111.

Although not particularly explained in the above embodiment, it is possible to attach a plurality of sheets of recording paper to the transfer drum in accordance with the size of the recording paper and record an image on the plurality of recording sheets at once, thereby increasing the copy quantity. An operation of recording an image by attaching a plurality of recording sheets to the transfer drum will be described below.

Figure 16:
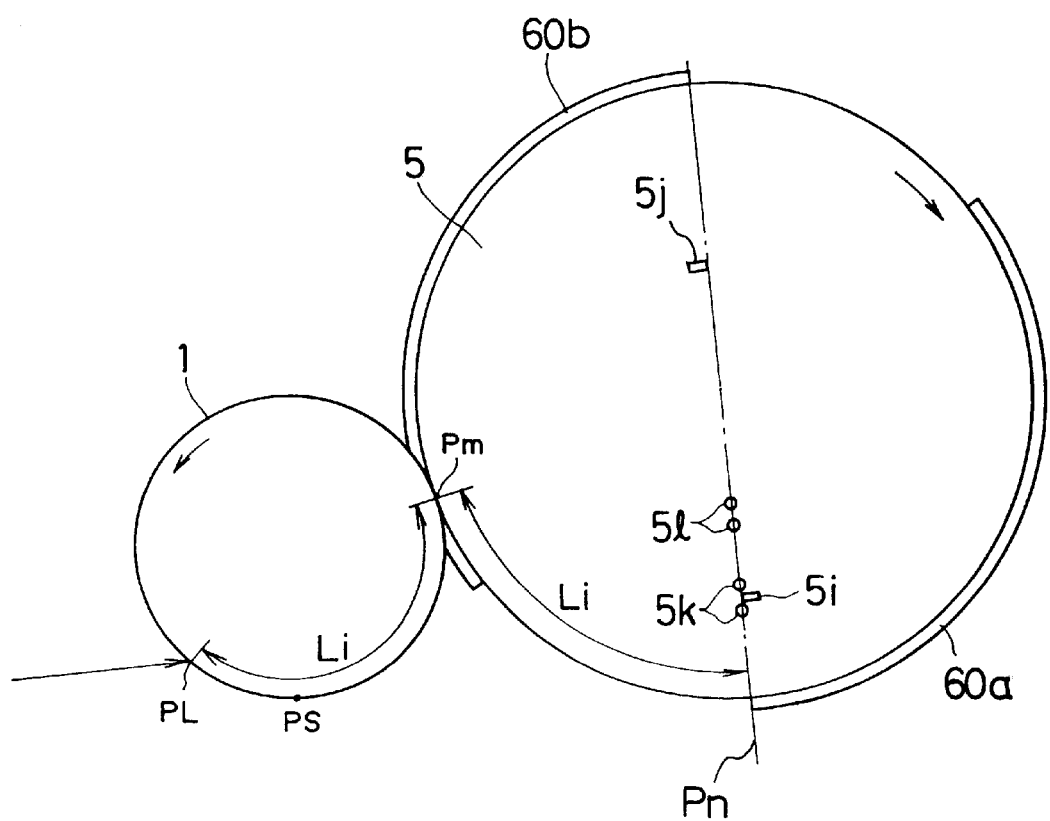
FIG. 16 is a view showing a transfer drum and a photosensitive drum in the embodiment of the present invention.

FIG. 16 is a view showing the photosensitive drum 1 and the transfer drum 5 illustrated in FIG. 1.

In this embodiment, the transfer drum 5 has a diameter of 160 mm and a circumference of 502.6 mm. When transfer sheets are large-size sheets, e.g., A3-size, B4-size, or ledger-size sheets, one transfer sheet is attached to the transfer drum 5 at a time.

This is so because the length of this transfer sheet is larger than the half circumference of the transfer drum 5.

If transfer sheets are small-size sheets, such as A4-size or letter-size sheets, whose length in the circumferential direction of the transfer drum is smaller than the half circumference of the transfer drum, a plurality of the transfer sheets can be attached to the transfer drum 5 at once.

FIG. 16 shows the state in which two A4-size transfer sheets 60 are attached to the transfer drum 5. Reference numerals 5i and 5j denote flags mounted on the transfer drum and rotated together with the transfer drum; and 5k and 5l, photosensors fixed to the apparatus. As in FIG. 16, the photosensors 5k and 5l detect passing of the flags 5i and 5j, respectively.

In the circumferential direction of the photosensitive drum 1, an electrostatic latent image formed by a laser beam at a position PL is developed by toner at a position Ps. The toner image is then transferred to a transfer sheet attached to the transfer drum 5 at a position Pm at which the transfer drum 5 and the photosensitive drum 1 are in contact. Note that the distance from the latent image formation position PL to the transfer position Pm is Li. A transfer sheet 60-a is so attached to the transfer drum 5 that the flag 5i comes to the position of the photosensor 5k when the leading end of the transfer sheet 60-a comes to a position before the transfer position Pm by the distance Li. Likewise, a transfer sheet 60-b is so attached to the transfer drum 5 that the flag 5j comes to the position of the photosensor 5l when the leading end of the transfer sheet 60-b comes to a position before the transfer position Pm by the distance Li. Therefore, by starting formation of a latent image on the photosensitive drum 1 when the photosensor 5k or 5l detects the passage of the flag 5i or 5j, the leading end of the formed image is aligned with the leading end of the transfer sheet.

On the other hand, if transfer sheets are large-size sheets such as A3-size, B4-size, or ledger-size sheets, only one transfer sheet can be attached to the transfer drum 5. In this case, the leading end of the transfer sheet is attached to the same position as the leading end of the transfer sheet 60-a in FIG. 16. That is, in the case of large-size transfer sheets, the output from the photosensor 5k is used as the sync signal for the leading end of an image.

Figure 17:
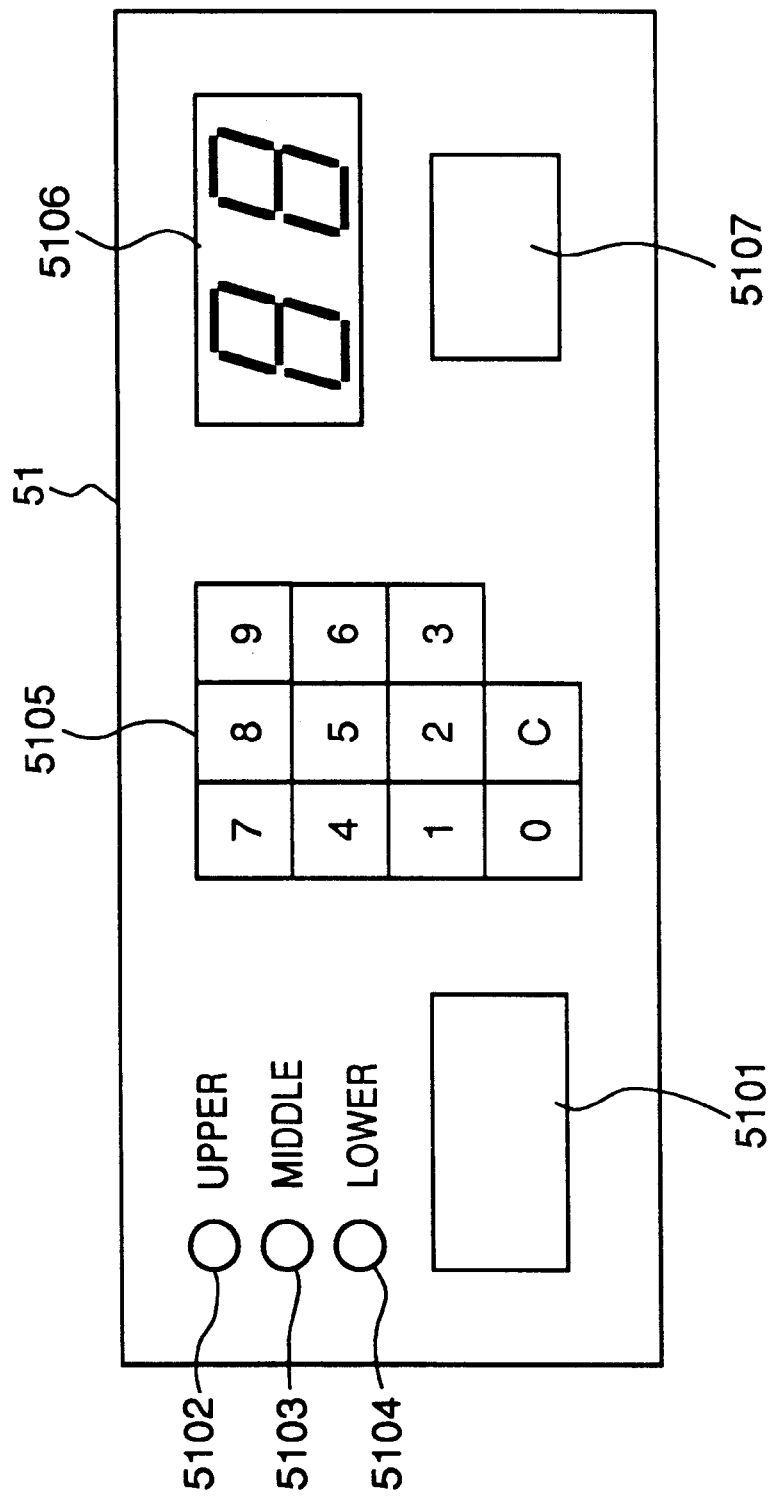
FIG. 17 is a view showing an operation unit in the embodiment of the present invention.

Control of the image formation will be described below with reference to flow charts. FIG. 17 shows the operation unit 51 in this embodiment.

In FIG. 17, reference numeral 5101 denotes a paper feed cassette select switch; 5102 to 5104, LED indicators for indicating which of upper, middle, and lower cassettes 7a, 7b, and 7c is chosen; 5105, a ten-key pad for entering the number of copies and a clear key for clearing the input number; 5106, an input number display which is constituted by two 7-segment LEDs; and 5107, a copy start key.

Figure 18:
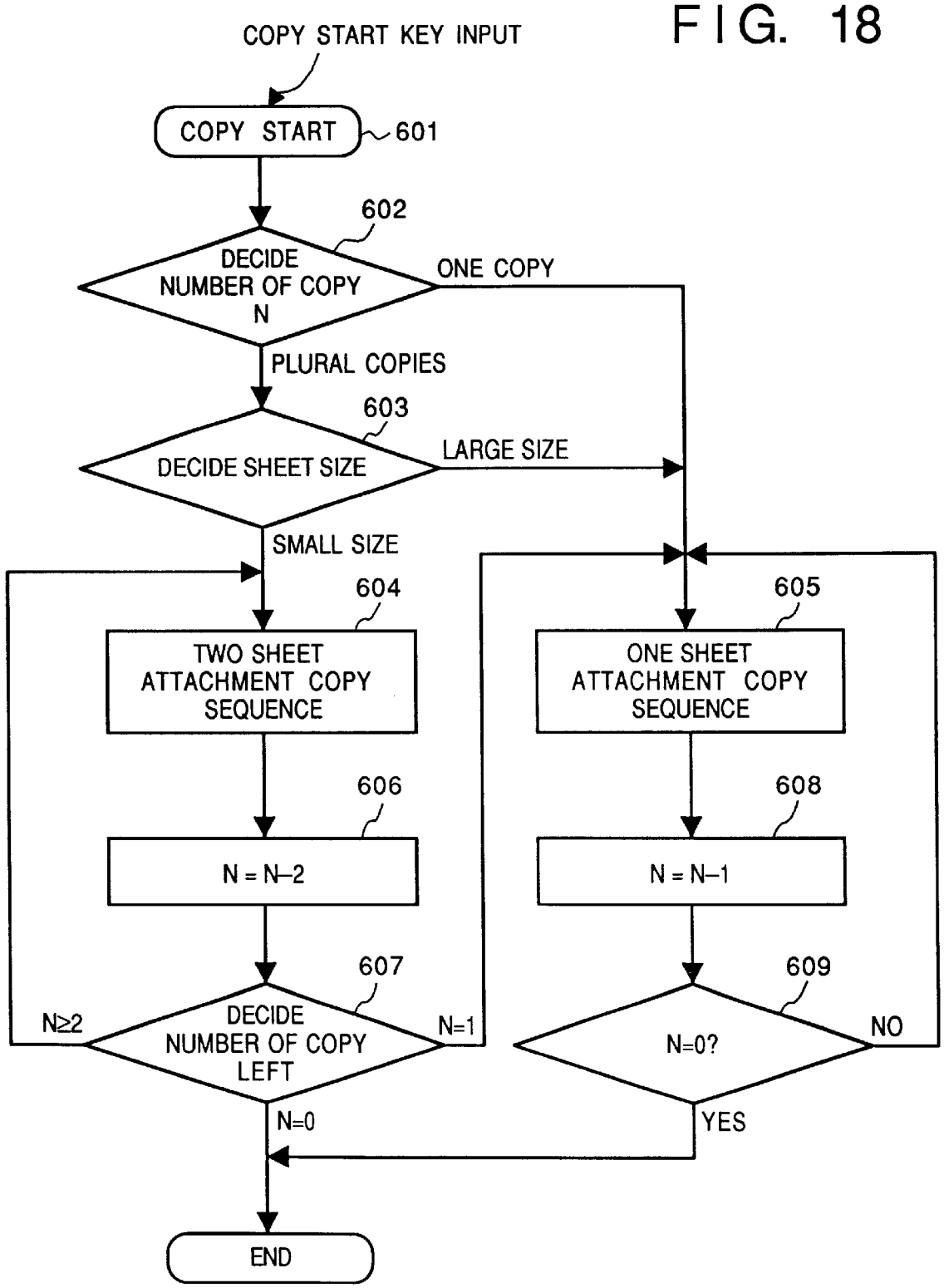
FIG. 18 is a flow chart for explaining the image formation operation in the embodiment of the present invention.

FIG. 18 is a flow chart showing control of the copy operation performed by the CPU 116. In step 601, the copy start key 5107 of the operation unit 51 is depressed by an operator. In step 602, the CPU 116 decides a number N of copies entered with the ten-key pad of the operation unit 51. If the copy number N indicates plural copies, the CPU 116 decides the sheet size in step 603.

If it is determined in steps 602 and 603 that the copy number indicates plural copies and the sheet size is a small size, a two sheet attachment copy sequence is executed in step 604. In this case, the "small size" means a sheet size such as A4 size or letter size, two transfer sheets of which size can be simultaneously attached to the transfer drum 5.

If, on the other hand, it is determined in steps 602 and 603 that the sheet size is A3 size, B4 size, or ledger size, in which case only one transfer sheet can be wound on the transfer drum 5, or that the copy number indicates one copy although the sheet size is the small size, a one sheet attachment copy sequence is executed in step 605.

In the two sheet attachment copy sequence, two copies are made by rotating the transfer drum 5 once. Therefore, the CPU 116 subtracts 2 zfrom the copy number N in step 606 and decides the number of copies left in step 607. If the number N of copies left is 2 or more, the two sheet attachment copy sequence is again executed in step 604. If the number N is 1, the one remaining copy is formed by the one sheet attachment copy sequence in step 605. If N is 0, the copying is completed.

If the one sheet attachment copy sequence is done in step 605, the CPU 116 subtracts 1 from the copy number N in step 608 and decides the number of copies left in step 609. If the number N is 0, the CPU 116 ends the copy operation. If N is not 0, the CPU 116 again executes the one sheet attachment copy sequence in step 605.

Figure 19:
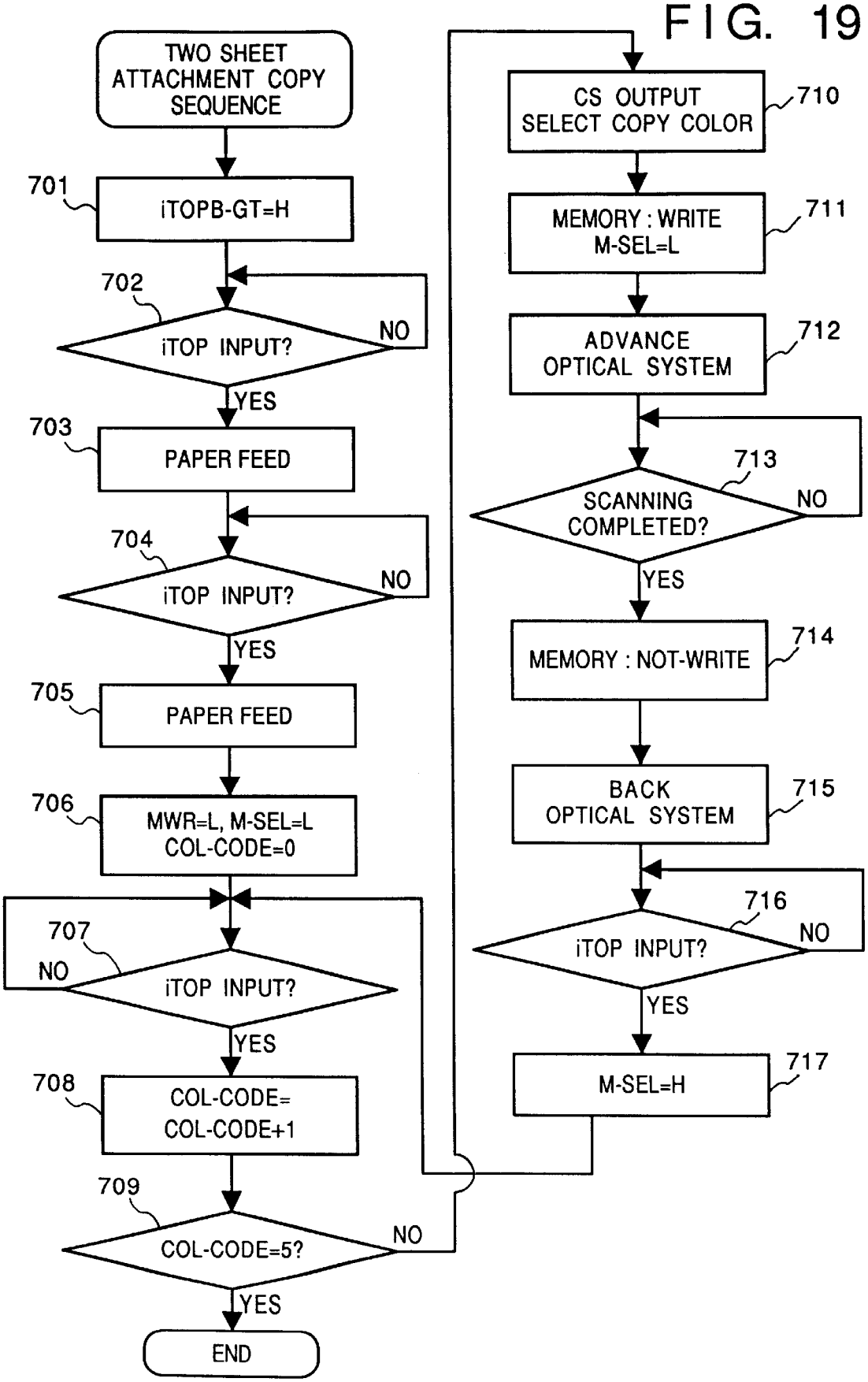
FIG. 19 is a flow chart for explaining the two sheet attachment image formation sequence performed by the embodiment of the present invention.

FIG. 19 is a flow chart showing control of the two sheet attachment copy sequence performed by the CPU 116.

In step 701, the CPU 116 sets the ITOPB-GT signal to level H. Consequently, the ITOPA and ITOPB signals generated every half rotation of the transfer drum 5 are ANDed and ORed by the gates 305 and 306 and applied to the CPU 116 as the ITOP signal. With this ITOP signal generated every half rotation of the transfer drum 5, the CPU 116 controls two sheet attachment to the transfer drum 5 and controls image output to these two sheets.

Upon detecting the input of the ITOP signal in step 702, the CPU 116 drives, in step 704, the pickup roller (27a, 27b, or 27c) of the selected paper feed cassette, the paper feed roller, and the register roller by using the PF signal from the I/O port 120, thereby attaching the first transfer sheet to the transfer drum 5. Upon detecting the input of the next ITOP signal in step 704, the CPU 116 attaches the second transfer sheet to the transfer drum 5 in step 705.

In this manner, these two transfer sheets are attached to the transfer drum 5 as illustrated in FIG. 16.

In step 706, the CPU 116 sets the MSEL signal to level L by setting the memory 111 in the write standby state as mentioned earlier and also sets 0 in a COL-CODE register provided in an internal memory (not shown) of the CPU 116. Note that multivalued image signals are to be stored in the memory 111 in this embodiment. In step 707, the CPU 116 waits until the ITOP signal is input, in order to identify the image recording start timing for the first transfer sheet attached to the transfer drum 5. When the ITOP signal is input, the CPU 116 increments the COL-CODE register by one in step 708. This COL-CODE register represents a recording color; 1, 2, 3, and 4 correspond to magenta (M), cyan (C), yellow (Y), and black (Bk), respectively.

In step 709, the CPU 116 decides whether recording of four colors is completed by checking the COL-CODE register. If the COL-CODE register has any of 1 to 4, recording of four colors has not been completed yet. Therefore, the CPU 116 performs image recording in the steps from step 710.

First, in step 710, the CPU 116 switches the selector 110 to the position of selecting a predetermined color signal to be copied. In step 711, the CPU 116 sets the MWR signal to level H to record the (multivalued) image signal READ-DT read by the CCD 34 into the memory 111 as discussed earlier, and sets the M-SEL signal to level L to record the first image by using the signal READ-DT.

After the preparation as described above, the CPU 116 causes the optical system motor controller 117 to drive the motor 35, in step 712, to advance the optical system, thereby recording the first image on the basis of the image signal READ-DT read by the CCD 34. The CPU 116 also causes the memory 111 to store the image signal READ-DT. In step 713, the CPU 116 waits until scanning of the original by a distance corresponding to the sheet size is completed. In step 714, the CPU 116 sets the memory 111 in the write disable state, ending the write to the memory.

Thereafter, in step 715, the CPU 116 starts the operation for returning the optical system to the original read start position. In step 716, the CPU 116 waits until the ITOP signal corresponding to the second sheet is input. When the ITOP signal is input, the CPU 116 sets the M-SEL signal to level H, in step 717, to record the second image by using the image signal MEMDT obtained by reading out the image signal written in the memory 111. In this way, image recording for one color is completed. For the second and subsequent colors, steps 710 to 717 are repeatedly performed.

As described above, when the sheet size is the small size, the image signal READ-DT is chosen as the image recording signal VIDEO for the first transfer sheet attached to the transfer drum 5, and is written in the memory 111 by setting the memory 111 in the write state. For the second transfer sheet, the image signal used in the image recording for the first sheet is read out from the memory 111 as MEM-DT and used as the recording image signal VIDEO to perform image recording for the second transfer sheet.

In this manner, a multivalued image signal obtained by reading an original is stored in the memory and at the same time the first image is formed, and the second image is formed by reading out the image signal from the memory. Consequently, the number of images formable at once can be increased. In addition, this makes it unnecessary to scan an original each time an image of one color is recorded on a sheet.

That is, since it is only necessary to form the second image by reading out the image stored in the memory, scan for formation of the second image is unnecessary.

In the above embodiment, multivalued image signals obtained by reading an original are stored in the memory and used in image formation. It is, however, also possible to form images by receiving multivalued or binary image signals from an external device.

Figure 20:
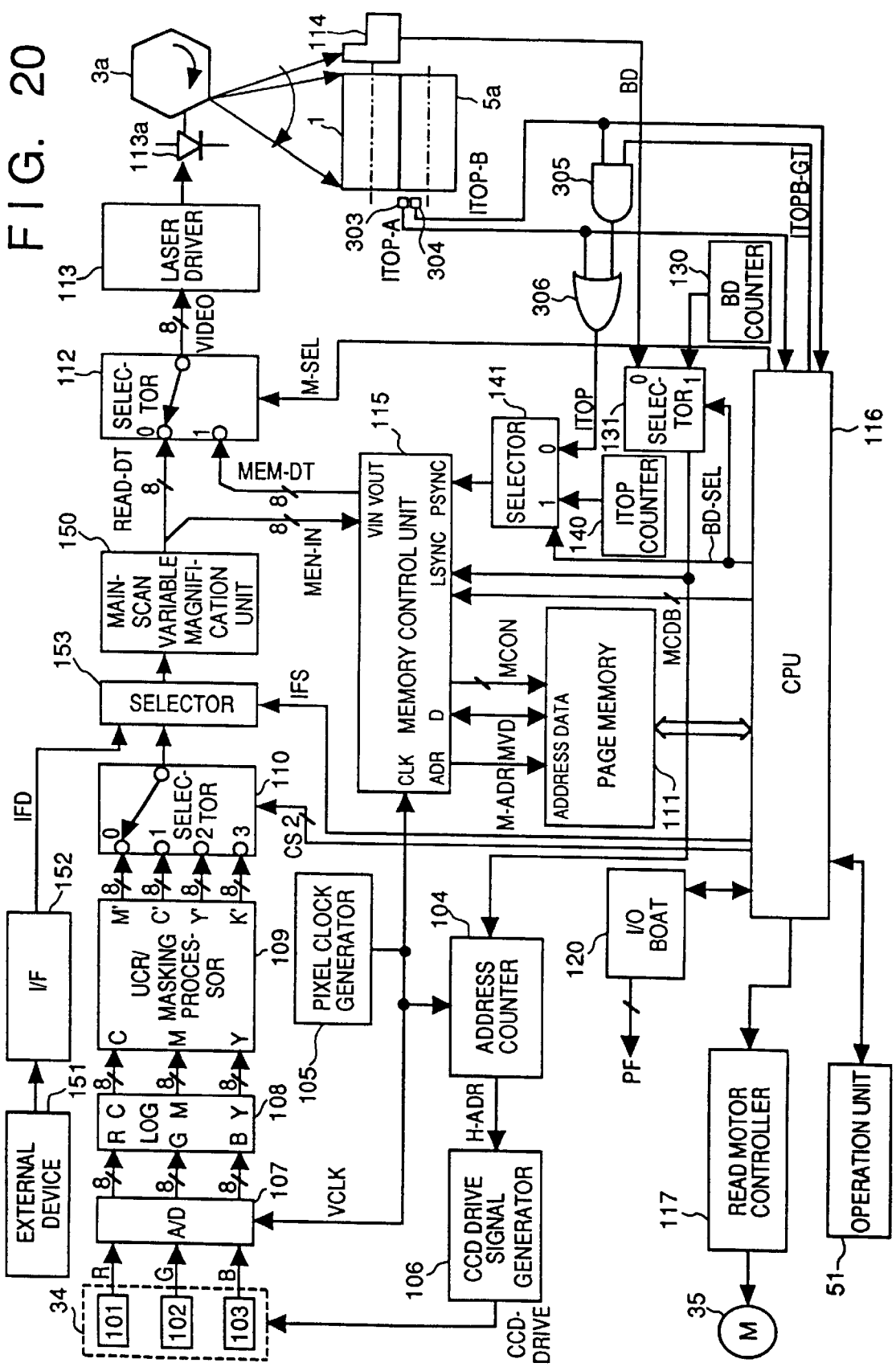
FIG. 20 is a block diagram showing the arrangement of an image forming apparatus as another embodiment of the present invention.

FIG. 20 shows an embodiment of the arrangement of an image forming apparatus for that purpose.

In FIG. 20, reference numeral 151 denotes an external device such as a computer; and 152, an interface for transmitting image signals between the computer 151 and the apparatus main body.

An operation in which output image signals of four colors from the computer 151 are stored in a memory 111 and images corresponding to the stored image signals are formed by the above-mentioned two sheet attachment copy sequence will be described below for each of the case in which the input image signals are multivalued ones and the case in which they are binary ones.

First, the case in which multivalued image signals are transmitted to form images will be described.

In this case, the computer 151 outputs a ultivalued (8-bit) image signal IFD of M (magenta) in an 8-bit parallel manner to a selector 153 via the interface 152. The selector 153 selectively outputs signals generated inside the apparatus and externally input signals on the basis of an IFS signal from a CPU 116. The multivalued image signal of color M is stored in units of a plurality of pixels in the page memory 111 via a main-scan variable magnification unit 150 as discussed earlier.

Subsequently, the image signal read out from the memory 111 is used to record an image of M on two recording sheets attached to a transfer drum 5.

When the recording of the image M is completed, the CPU 116 sends a signal indicative of this information to the computer 151, and the computer 151 transmits a multivalued image signal of C (cyan). In the same fashion as described above, an image of C is formed on the two recording sheets.

Following the same procedure as above, image signals of Y (yellow) and BK (black) are sequentially transmitted to form their respective images, completing formation of the images on the two sheets.

If the number of recording sheets exceeds two, the image signal M is again transmitted, and the transmission, storage, data read access, and image formation as discussed above are repeatedly executed.

As described above, in forming images by externally transmitting multivalued image signals, an image signal must be transmitted each time two images of one color are formed.

An operation in which binary image signals of four colors from the computer 151 are stored in the memory 111 and images corresponding to the stored image signals are formed by the above-mentioned two sheet attachment copy sequence will be described below.

In this operation, binary image signals IFD of M, C, Y, and BK corresponding to one frame are serially output pixel by pixel from the computer 151 to the selector 153 via the interface 152. On the basis of the IFS signal from the CPU 116, the selector 153 selectively outputs image signals generated inside the apparatus and the externally input image signals IFD and writes the signals in the page memory 111 via the main-scan variable magnification unit 150.

If the externally input signals IFD are selected, these signals are stored in the page memory 111 in the same manner as for processing binary image signals as discussed earlier. That is, since the image signals transmitted from the computer 151 in this case are binary image signals, these image signals of four colors can be stored in the memory 111 at once. As described above, the page memory 111 can store an A4-size multivalued image signal of one color. Therefore, the page memory 111 is capable of storing A3-size image signals of four colors in the case of binary image signals.

Subsequently, the image signals of four colors stored in the memory 111 are sequentially read out to form images by the two sheet attachment sequence as discussed above.

In the formation of images performed by transmitting binary image signals from an external device, image signals of four colors can be transmitted and stored in the memory 111 at once unlike in the image formation performed by transmitting and storing multivalued image signals. Therefore, even if the number of recording sheets is increased, image signals once transmitted need not be transmitted again.

Also, in this embodiment, the storage and read of data are done in units of a plurality of pixels, as in the previous embodiment. This makes it possible to reduce the number of access times to the memory, resulting in an increased processing speed of image formation. The load on the memory controller can also be reduced.

In addition, even when multivalued image signals are input from an external device, it is possible to binarize the signals inside the image forming apparatus and store the resulting binary signals in the page memory 111.

Conversion of a multivalued image signal into a binary image signal can be done either automatically by reading the color and gradation information of the image signal or by designating the conversion manually using an operation unit or an external device.

In this embodiment, binary image signals are transmitted successively (serially) pixel by pixel (bit by bit). However, the transmission scheme is not limited to this.

As discussed above, in writing input binary image signals from an external device into the memory, write/read access to the memory is done in units of a plurality of pixels. Consequently, the number of memory access times is decreased to substantialy shorten the access time. Therefore, the image formation speed can be raised in forming image by reading out image signal from the memory.

Synthesis of two image signals will be described below.

To begin with, the processing is performed in the same fashion as discussed above from steps S501 to S508 in FIG. 12. The resulting image signal is written in the page memory 111 in a binary form. After the original on the original table glass 31 is replaced with the second original, the processing from step S509 is executed. In this case, the second original is read by the optical system at the same time the image signal is read out from the page memory. These two image signals are synthesized by, e.g., an OR gate (not shown) and used in formation of an image.

This method is particularly effective in synthesizing two originals when, for example, the first original is a monochromatic character original and the second original is a multi-gradation-level photographic original.

In rotating a full-color image, an image signal corresponding to magenta is selected from image signals that are read by the optical system and is written in the page memory 111. This magenta image signal is then read out while it is rotated as described above to form a magenta image. Subsequently, the selector 110 is switched to the position of writing a cyan image signal in the page memory 111. Thereafter, the cyan image signal is read out while it is rotated to form a cyan image. In the same manner, yellow and black image signals are sequentially written in the page memory 111 and read out while they are rotated to form respective color images. The result is a rotated full-color image.

In addition, it is easy to expand a page memory with a capacity of one A4-size page to a page memory with a capacity of one A3-size page. Note that in this embodiment, color originals can be copied without using the page memory 111. In this case, the signal M-SEL, FIG. 2, goes to "0", and the selector 112 selects the image data READ-DT and outputs as the signal VIDEO.

In this embodiment as discussed above, a plurality of pixel data of a read image signal are simultaneously written in the page memory and simultaneously read out from the memory while the data are output in the reverse order. Consequently, the substantial read/write speed of the page memory can be increased, thus increasing the process speed. Also, write/read access of each of a binary image signal and a multivalued image signal to the memory is performed in units of a plurality of pixels. Therefore, even when images are to be formed by using input binary image signals from an external device or the like, the efficiency of the memory access can be increased, and this results in an increased processing speed. Furthermore, rotation or the like processing can be performed for images. As a consequence, in copying an A3-size original onto A4-size recording paper by reduction, for example, the copy operation can be executed using recording paper of an A4-size recording paper cassette, making the use of an A4R-size recording paper cassette unnecessary.

Note that the present invention can be applied to either a system consisting of a plurality of device or an apparatus including only one device.

Note also that the present invention is similarly applicable to the arrangement achieved by supplying programs to a system or an apparatus.

According to the embodiments of the present invention as described above, there can be provided an image forming apparatus in which an image signal obtained by reading an original image is stored in units of a plurality of consecutive pixels, the stored image signal is read out in units of the plurality of pixels, and an image is formed by outputting the readout image signal in the order of pixels corresponding to the original size read by the reading means and the image size to be formed by the image forming means. In this image forming apparatus, the efficiency of the page memory access can be increased, and various original sizes can be handled without increasing the number of recording paper cassettes.

As many apparently widely different embodiments of the present invention can be made without departing from the spirit and scope thereof, it is to be understood that the invention is not limited to the specific embodiments thereof except as defined in the appended claims.

What is claimed is:

1. An image forming apparatus comprising:
   receiving means for receiving binary image data or multivalued image data for one pixel, which is transmitted by a computer;

retaining means for retaining a plurality of recording media;

image forming means for forming a same image on each of the plurality of recording media retained by said retaining means;

storage means for storing the multivalued image data of the same image to be formed, wherein said storage means can also store binary image data; and control means for controlling whether said image forming means starts image formation immediately or does not start until all of the image data for representing an image is received, in accordance with the type of the image data received by said receiving means.

2. The apparatus according to claim 1, wherein said image forming means forms an image by using color materials which have yellow, magenta, cyan and black colors.

3. The apparatus according to claim 1, wherein said storage means is a page memory.

4. The apparatus according to claim 1, wherein said apparatus and the computer are connected by a transmission line.

5. The apparatus according to claim 1, wherein said apparatus is connected to a scanner.

6. The apparatus according to claim 1, wherein said image forming means performs the image formation in each of plural color components, and wherein when the multivalued image data is received, said image forming means starts the image formation based on received color-component data, which corresponds to one of the plural color components and represents an image, without waiting for the other color-component data being received, and when the binary image data is received, said image forming means delays the start of the image formation until image data, which corresponds to all of the plural color components and represents an image, are received, in accordance with the control by said controlling means.

7. An image forming method of an image forming apparatus, said method comprising the steps of:

receiving binary image data or multivalued image data for one pixel, which is transmitted by a computer;

retaining a plurality of recording media;

forming a same image on each of the plurality of recording media which are retained;

storing the multivalued image data of the image to be formed in a memory, wherein the memory can also store binary image data; and controlling whether said image forming step starts image formation immediately or does not start until all of the image data for representing an image is received, in accordance with the type of the image data received in said receiving step.

8. The method according to claim 7, wherein in said image forming step, an image is formed by using color materials which have yellow, magenta, cyan and black colors.

9. The method according to claim 7, wherein the memory is a page memory.

10. The method according to claim 7, wherein the image forming apparatus and the computer are connected by a transmission line.

11. The method according to claim 7, wherein the image forming apparatus is connected to a scanner.

12. The method according to claim 7, wherein said image forming step performs the image formation in each of plural color components, and wherein when the multivalued image data is received, said image forming step starts the image formation based on received color-component data, which corresponds to one of the plural color components and represents an image, without waiting for the other color-component data being received, and when the binary image data is received, said image forming step delays the start of the image formation until image data, which corresponds to all of the plural color components and represents an image, are received, in accordance with the control in said controlling step.

* * * * *

UNITED STATES PATENT AND TRADEMARK OFFICE
CERTIFICATE OF CORRECTION

PATENT NO. : 6,459,503 B1     Page 1 of 2
APPLICATION NO. : 08/352879
DATED : October 1, 2002
INVENTOR(S) : Tsuji It is certified that error appears in the above-identified patent and that said Letters Patent is hereby corrected as shown below:

TITLE PAGE:

(*), after "0 days.", insert the following paragraph:

--This patent issued on a continued prosecution application filed under 37 CFR 1.53(d), and is subject to the twenty year patent term provisions of 35 U.S.C. 154(a)(2). --

(56)        References Cited

U.S. PATENT DOCUMENTS, add the following reference:

-- 4,862,282 A    8/1989    Nakajima    358/400 --

FOREIGN PATENT DOCUMENTS, add the following references:

-- EP    0 457 572    11/1991
    JP    4-30672      2/1992 --

COLUMN 1:
Line 31, "reducing" should read -- reducing it --.

COLUMN 3:
Line 30, "original.30" should read -- original 30 --.

COLUMN 6:
Line 23, "and" should read -- and is --.

COLUMN 8:
Line 59, "MADR" should read -- M-ADR --.

COLUMN 17:
Line 54, "MEMDT" should read -- MEM-DT --.

UNITED STATES PATENT AND TRADEMARK OFFICE
CERTIFICATE OF CORRECTION

PATENT NO. : 6,459,503 B1
APPLICATION NO. : 08/352879
DATED : October 1, 2002
INVENTOR(S) : Tsuji It is certified that error appears in the above-identified patent and that said Letters Patent is hereby corrected as shown below:

COLUMN 18:
Line 31, "ultivalued" should read -- multivalued --.

Signed and Sealed this

Twenty-third Day of October, 2007

JON W. DUDAS
*Director of the United States Patent and Trademark Office*